(12) United States Patent
Weiberle et al.

(10) Patent No.: US 8,090,983 B2
(45) Date of Patent: Jan. 3, 2012

(54) METHOD AND DEVICE FOR PERFORMING SWITCHOVER OPERATIONS IN A COMPUTER SYSTEM HAVING AT LEAST TWO EXECUTION UNITS

(75) Inventors: Reinhard Weiberle, Vaihingen/Enz (DE); Bernd Mueller, Gerlingen (DE); Eberhard Boehl, Reutlingen (DE); Yorck Von Collani, Beilstein (DE); Rainer Gmehlich, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 616 days.

(21) Appl. No.: 11/666,184

(22) PCT Filed: Oct. 25, 2005

(86) PCT No.: PCT/EP2005/055500
§ 371 (c)(1),
(2), (4) Date: Sep. 26, 2008

(87) PCT Pub. No.: WO2006/045775
PCT Pub. Date: May 4, 2006

(65) Prior Publication Data
US 2009/0204740 A1    Aug. 13, 2009

(30) Foreign Application Priority Data

| Oct. 25, 2004 | (DE) | 10 2004 051 937 |
| Oct. 25, 2004 | (DE) | 10 2004 051 950 |
| Oct. 25, 2004 | (DE) | 10 2004 051 952 |
| Oct. 25, 2004 | (DE) | 10 2004 051 964 |
| Oct. 25, 2004 | (DE) | 10 2004 051 992 |
| Aug. 8, 2005 | (DE) | 10 2005 037 220 |

(51) Int. Cl.
*G06F 15/80* (2006.01)

(52) U.S. Cl. ............ 714/11; 714/10; 711/153; 711/163
(58) Field of Classification Search ................ 714/11, 714/10
See application file for complete search history.

(56) References Cited

U.S. PATENT DOCUMENTS

| 5,732,209 | A * | 3/1998 | Vigil et al. .............. 714/30 |
| 5,995,750 | A * | 11/1999 | Samson et al. .......... 718/107 |
| 6,438,720 | B1 * | 8/2002 | Boutaud et al. ......... 714/724 |
| 6,615,366 | B1 * | 9/2003 | Grochowski et al. ..... 714/10 |
| 2001/0042202 | A1 * | 11/2001 | Horvath et al. .......... 713/154 |

(Continued)

FOREIGN PATENT DOCUMENTS

JP    2004157865    6/2004

(Continued)

*Primary Examiner* — Scott Baderman
*Assistant Examiner* — Chae Ko
(74) *Attorney, Agent, or Firm* — Kenyon & Kenyon LLP

(57) ABSTRACT

A method and device for performing switchover operations in a computer system having at least two execution units are provided, in which switchover units are included which are configured in such a way that they switch over between at least two operating modes, a first operating mode corresponding to a compare mode, and a second operating mode corresponding to a performance mode. An interrupt controller is provided and, furthermore, at least three memory areas are provided, and the access to the memory areas is implemented in such a way that one first memory area is assigned to at least one first execution unit, and one second memory area is assigned to the at least one second execution unit, and at least one third memory area is assignable to the at least two execution units.

23 Claims, 23 Drawing Sheets

U.S. PATENT DOCUMENTS

| | | | |
|---|---|---|---|
| 2001/0049770 A1* | 12/2001 | Cai et al. | 711/129 |
| 2002/0073357 A1* | 6/2002 | Dhong et al. | 714/19 |
| 2002/0123201 A1 | 9/2002 | So et al. | |
| 2003/0009648 A1* | 1/2003 | Doing et al. | 711/202 |
| 2004/0123201 A1* | 6/2004 | Nguyen et al. | 714/736 |
| 2004/0143712 A1* | 7/2004 | Armstrong et al. | 711/152 |
| 2004/0236879 A1* | 11/2004 | Croxford et al. | 710/48 |
| 2005/0091410 A1* | 4/2005 | Gibart et al. | 709/248 |
| 2005/0091476 A1* | 4/2005 | Doing et al. | 712/227 |
| 2005/0132364 A1* | 6/2005 | Tewari et al. | 718/1 |
| 2005/0216696 A1* | 9/2005 | Kawaguchi | 711/206 |
| 2005/0240793 A1* | 10/2005 | Safford et al. | 714/1 |
| 2005/0257224 A1* | 11/2005 | Whalen | 719/318 |
| 2006/0085582 A1* | 4/2006 | Shikano et al. | 710/260 |
| 2006/0117133 A1* | 6/2006 | Hinrichs | 711/103 |
| 2006/0248287 A1* | 11/2006 | Buyuktosunoglu et al. | 711/146 |
| 2008/0046665 A1* | 2/2008 | Kim | 711/149 |

FOREIGN PATENT DOCUMENTS

WO　　WO 2005/003962　　1/2005

* cited by examiner

METHOD AND DEVICE FOR PERFORMING SWITCHOVER OPERATIONS IN A COMPUTER SYSTEM HAVING AT LEAST TWO EXECUTION UNITS

BACKGROUND OF THE INVENTION

1. Field of the Invention

The present invention relates to a method and a device for performing switchover operations in a computer system having at least two execution units.

2. Description of Related Art

Transient errors, triggered by alpha particles or cosmic radiation, are an increasing problem for integrated semiconductor circuits. Due to declining structure widths, decreasing voltages and higher clock frequencies, there is an increased probability that a voltage spike, caused by an alpha particle or by cosmic radiation, will falsify a logic value in an integrated circuit. The effect can be a false calculation result. In safety-relevant systems, especially in the motor vehicle, such errors must therefore be reliably detected.

In safety-relevant systems such as an ABS control system in a motor vehicle where malfunctions of the electronic equipment must be detected with certainty, redundancies for error detection are normally used in the corresponding control devices of such systems. For instance, in known ABS systems, the complete microcontroller is duplicated in each case, the total ABS functions being calculated redundantly and checked for agreement. If a discrepancy appears in the results, the ABS system is switched off.

Essential components of a microcontroller are, for one, storage modules (e.g., RAM, ROM, cache), the core and the input/output interfaces, the so-called peripherals (e.g., analog-digital converter, CAN interface). Since storage elements can be effectively monitored using test codes (parity or ECC), and peripherals are often monitored specific to the application as part of a sensor signal path or actuator signal path, a further redundancy approach lies in solely doubling the core of a microcontroller.

Such microcontrollers having two integrated cores are also known as dual-core architectures. Both cores execute the same program segment redundantly and in clock-controlled synchronism (lockstep mode), the results of the two cores are compared, and an error will then be detected in the comparison for agreement. This configuration of a dual-core system may be denoted as a compare mode.

Dual-core architectures are also used in other applications to increase output, i.e., for performance enhancement. Both cores execute different programs, program segments and instructions, whereby an increase in output can be achieved, which is why this configuration of a dual-core system may be denoted as a performance mode. This system is also called a symmetrical multiprocessor system (SMP).

An expansion of these systems involves a switchover between these two modes, by software, by way of an access to a special address and specialized hardware devices. In compare mode, the output signals of the cores are compared to each other. In performance mode, the two cores operate as a symmetrical multiprocessor system (SMP) and execute different programs, program segments or instructions.

When using such systems, the problem occurs that in the switchover, it is also necessary to switch interrupt sources. Therefore, the object of the present invention is to provide methods and means which permit an optimal switchover of the interrupt sources.

BRIEF SUMMARY OF THE INVENTION

In accordance with the present invention, a switchover method is provided in a computer system having at least two execution units, switching means being included, which are configured in such a way that they switch between at least two operating modes, a first operating mode corresponding to a compare mode, and a second operating mode corresponding to a performance mode, wherein an interrupt controller is provided and, in addition, at least three memory areas are provided, and the access to the memory areas is implemented such that at least one first execution unit is assigned a first memory area, and at least one second execution unit is assigned a second memory area, and at least one third memory area is able to be assigned to the at least two execution units.

In an advantageous manner, a method is provided where, in performance mode, each execution unit is assigned an individual memory area, the memory areas being assigned precisely one interrupt controller.

In an advantageous manner, a method is provided where, in performance mode, each execution unit is assigned one memory area, and precisely one interrupt controller is assigned to all memory areas.

In an advantageous manner, a method is provided where all interrupt sources are assigned to the interrupt controller.

In an advantageous manner, a method is provided where, in a performance mode, one first memory area is assigned to at least one first execution unit, and one second memory area is assigned to at least one second execution unit.

In an advantageous manner, a method is provided where, in a compare mode, at least one third memory area is assigned to the at least two execution units.

In an advantageous manner, a method is provided where, in a performance mode, only the assignment is active in which one memory area is assigned to each execution unit.

In an advantageous manner, a method is provided where, in compare mode, only the assignment is active in which the at least third memory area is assigned to the at least two execution units.

In an advantageous manner, a method is provided where, in each mode only precisely one scheme of assignments is active, in such a way that there is precisely one memory area for each execution unit, which is assigned by one of the active assignments.

In an advantageous manner, a method is provided where the scheme of the active assignments changes in the switchover from a comparison to a performance mode.

In an advantageous manner, a device is provided for the switchover in a computer system having at least two execution units, switching means being included which are configured such that they switch between at least two operating modes, a first operating mode corresponding to a compare mode, and a second operating mode corresponding to a performance mode, which is characterized by the inclusion of an interrupt controller to which at least three memory areas are assigned, at least one first memory area being assigned to the at least one first execution unit, and one second memory area being assigned to the at least one second execution unit, and at least one third memory area being assignable to the at least two execution units.

In an advantageous manner, a device is provided in which in performance mode each execution unit is assigned one memory area, and precisely one interrupt controller is provided.

In an advantageous manner, a device is provided in which interrupt sources are assigned to the interrupt controller.

In an advantageous manner, a device is provided in which, in the performance mode, one first memory area is assigned to at least one first execution unit, and one second memory area is assigned to at least one second execution unit.

In an advantageous manner, a device is provided in which, in the compare mode, at least one third memory area is assigned to the at least two execution units.

In an advantageous manner, a device is provided in which the memory areas are situated in the interrupt controller.

In an advantageous manner, a device is provided in which, in a performance mode, only the particular assignment is active in which one memory area is assigned to each execution unit.

In an advantageous manner, a device is provided in which, in a performance mode, only the particular assignment is active in which one memory area is assigned to each execution unit.

In an advantageous manner, a device is provided in which, in a compare mode, only the particular assignment is active in which the at least third memory area is assigned to the at least two execution units.

In an advantageous manner, a device is provided in which only precisely one scheme of assignments is active in every mode, in such a way that there is precisely one memory area for each execution unit, which is assigned by one of the active assignments.

In an advantageous manner, a device is provided in which the scheme of the active assignments changes in the switchover from a compare to a performance mode.

In an advantageous manner, a device is provided in which, in the switchover from a compare to a performance mode, a shift of active assignment takes place by the activation of switches.

In an advantageous manner, a method is provided where writing to the assigned memory areas is not allowed in all modes.

In an advantageous manner, a method is provided where writing to the assigned memory areas is allowed only in those modes in which the assignment is active.

BRIEF DESCRIPTION OF THE VARIOUS VIEWS OF THE DRAWING

Figure 5:
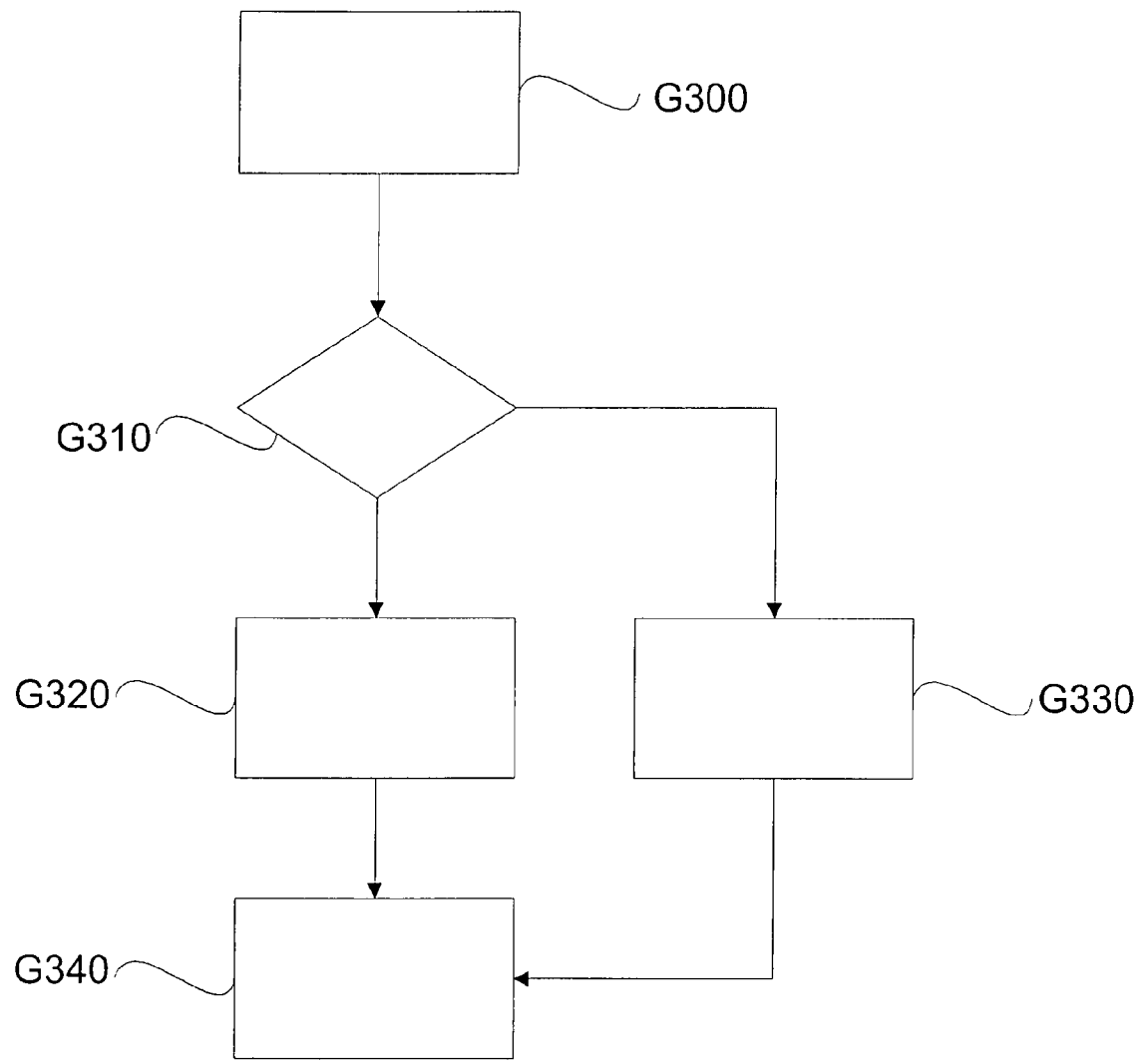

FIG. 5, in the form of a flow chart, illustrates a method which, within a special pipeline stage G230a, G230b, exchanges a special undefined bit combination with an NOP or other neutral bit combination.

Figure 6:
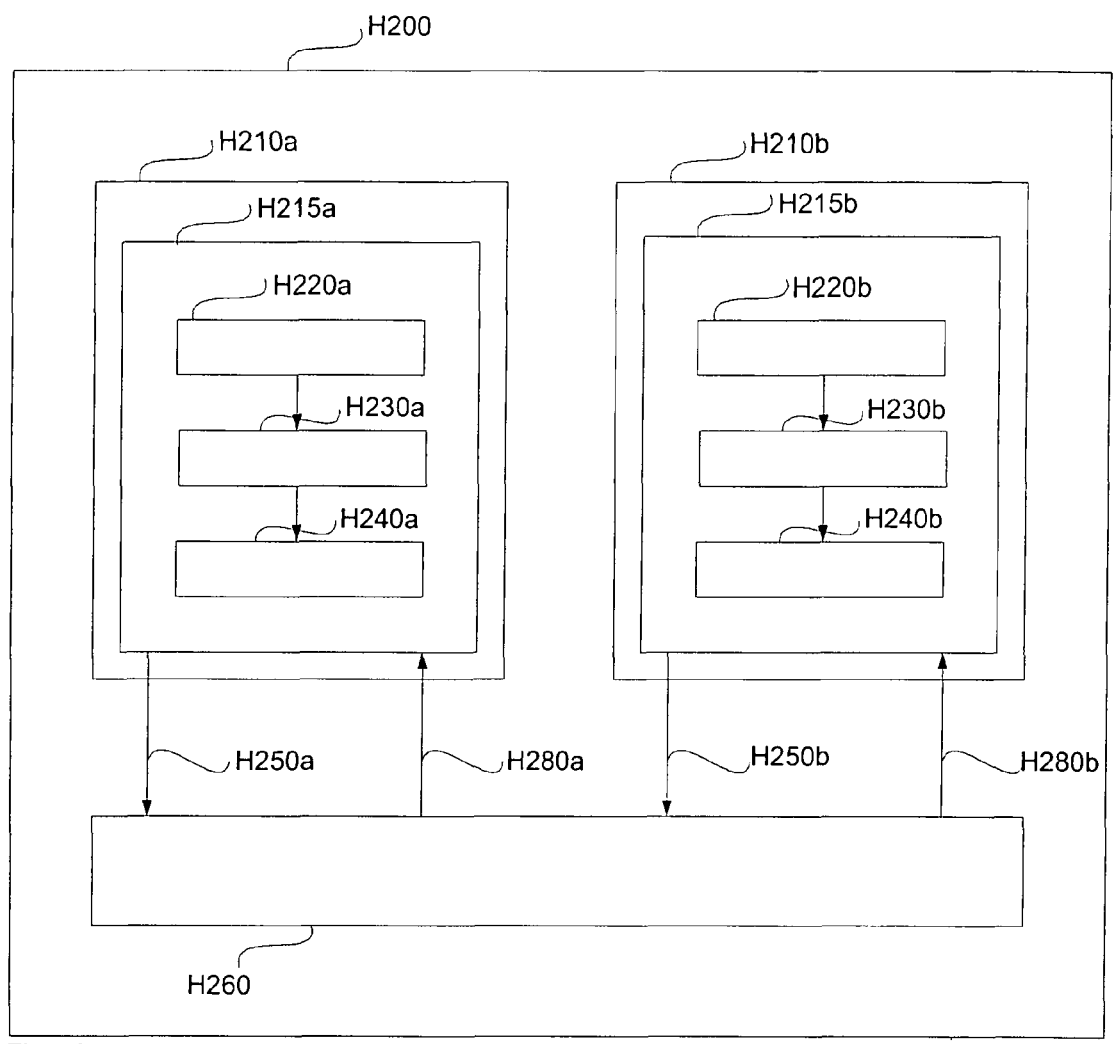

FIG. 6 shows a multiprocessor system H200 having two execution units H210a, H210b and a switchover and compare unit H260.

Figure 7:
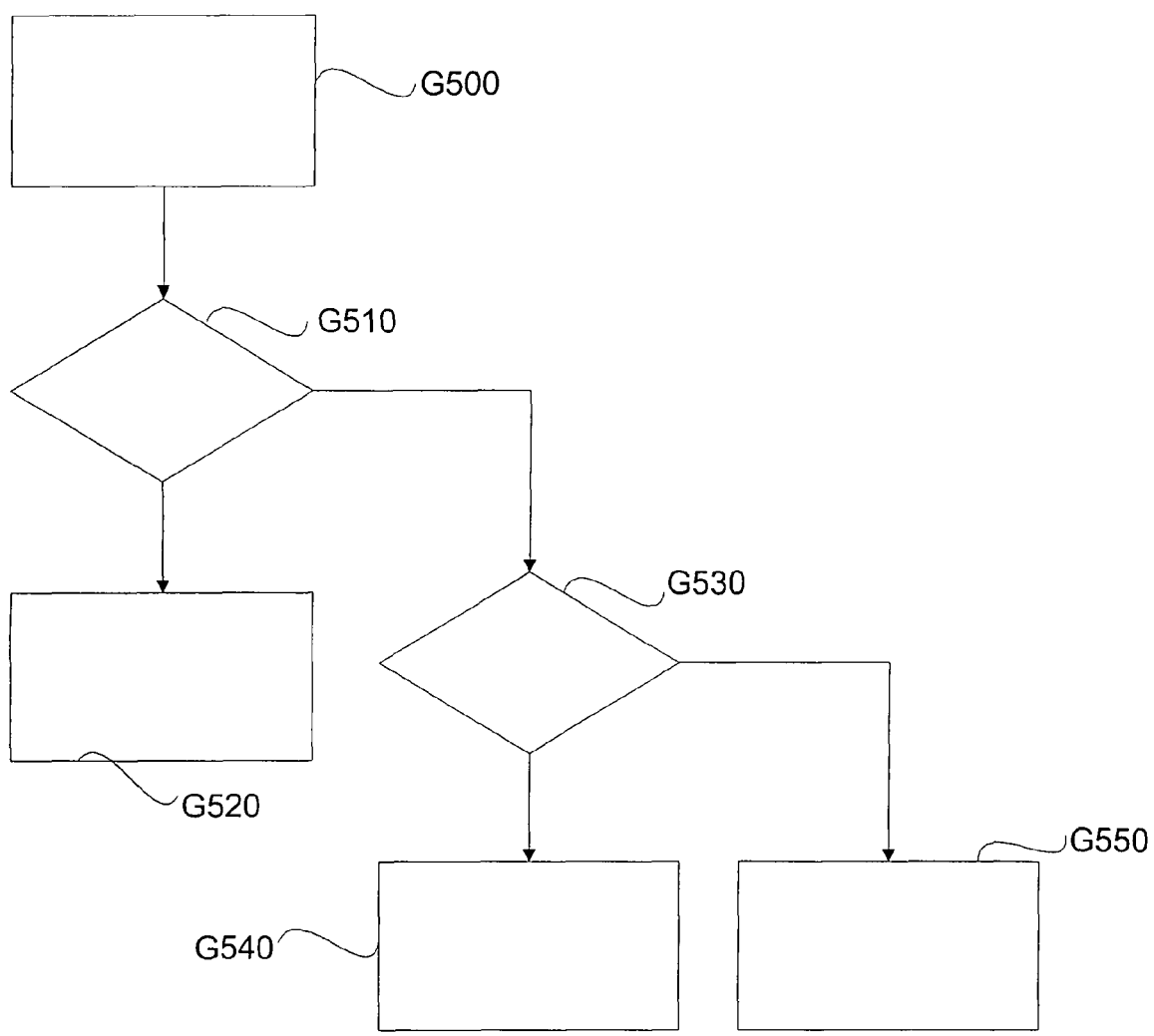

FIG. 7, in the form of a flowchart, depicts a method that illustrates how, with the aid of the unit ID, the program flow can be separated in the change from a compare mode to a performance mode in a multiprocessor system having two execution units.

Figure 8:
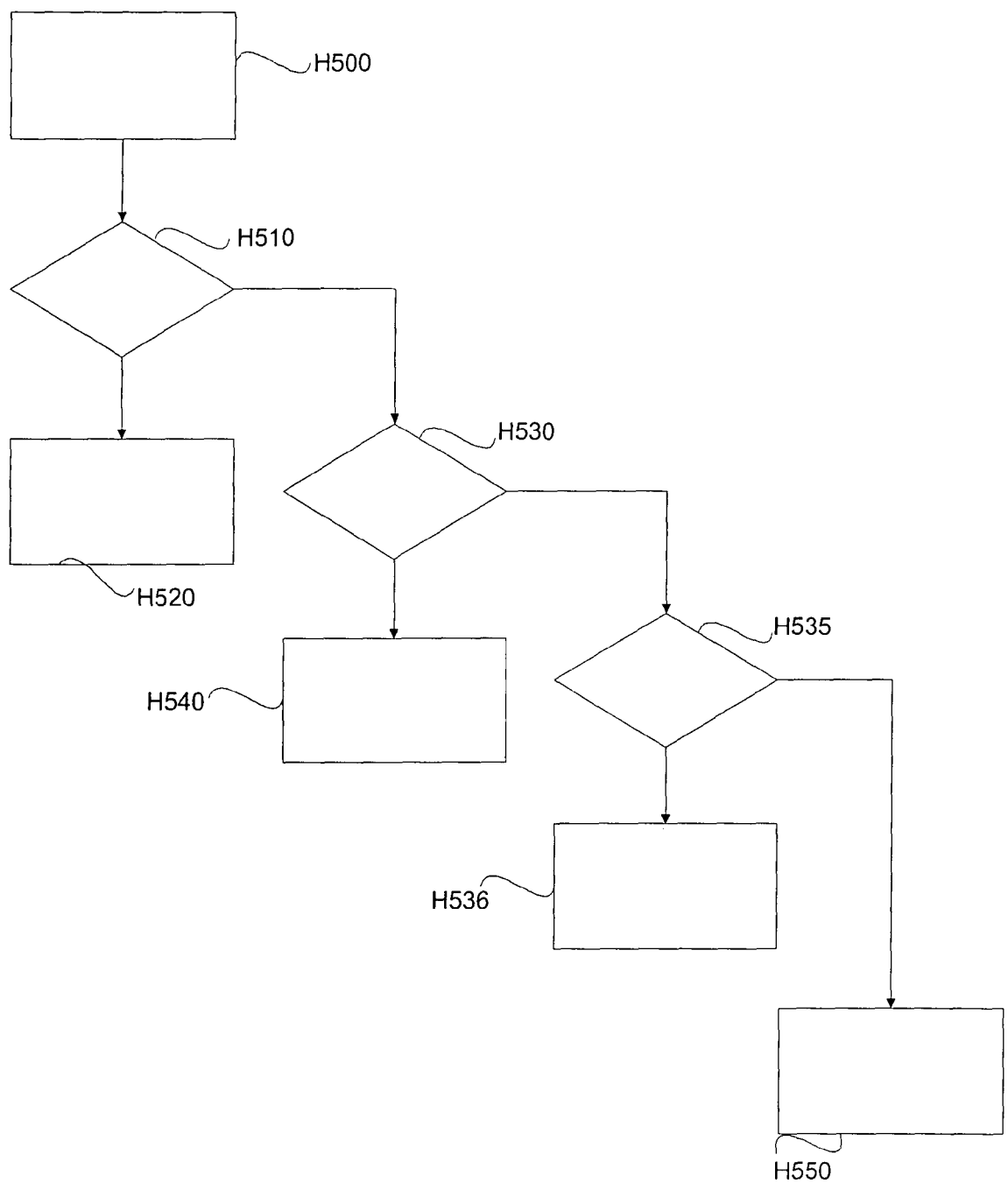

FIG. 8 shows one example method as to how, with the aid of the unit ID, the program flow can be separated in the change from a compare mode to a performance mode in a multiprocessor system having three execution units.

Figure 9:
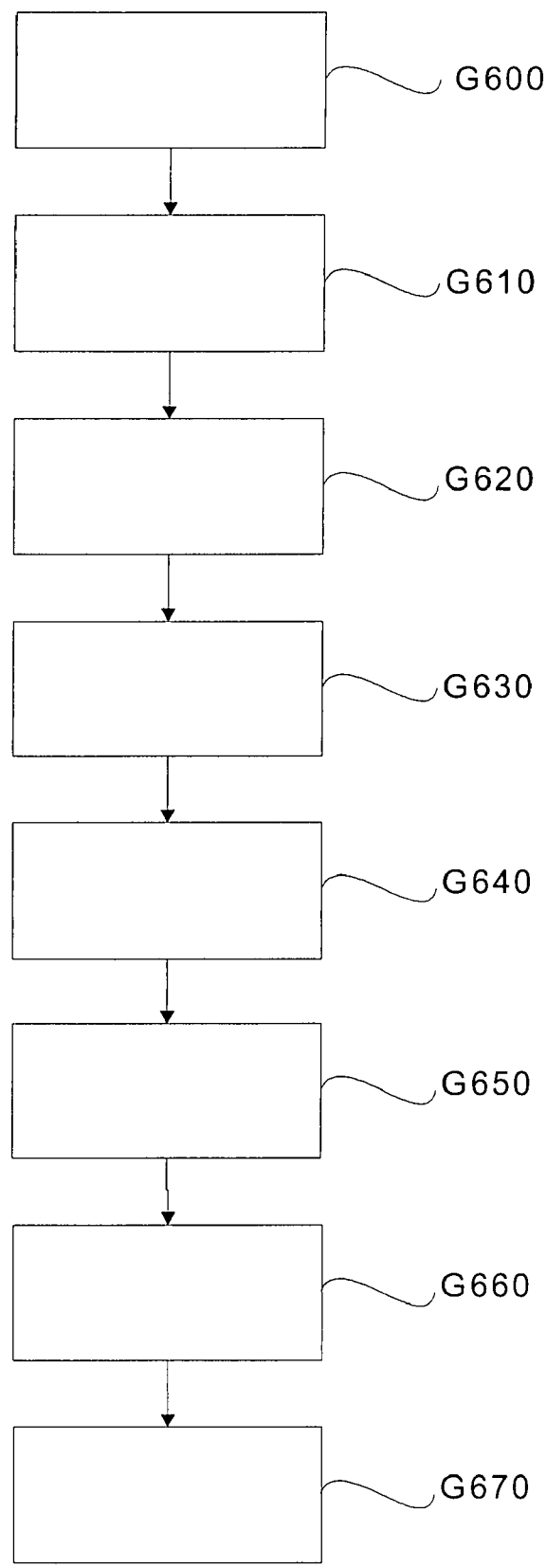

FIG. 9, in the form of a flow chart, shows a method that synchronizes the execution units upon the switchover from the performance mode to the compare mode.

Figure 10:
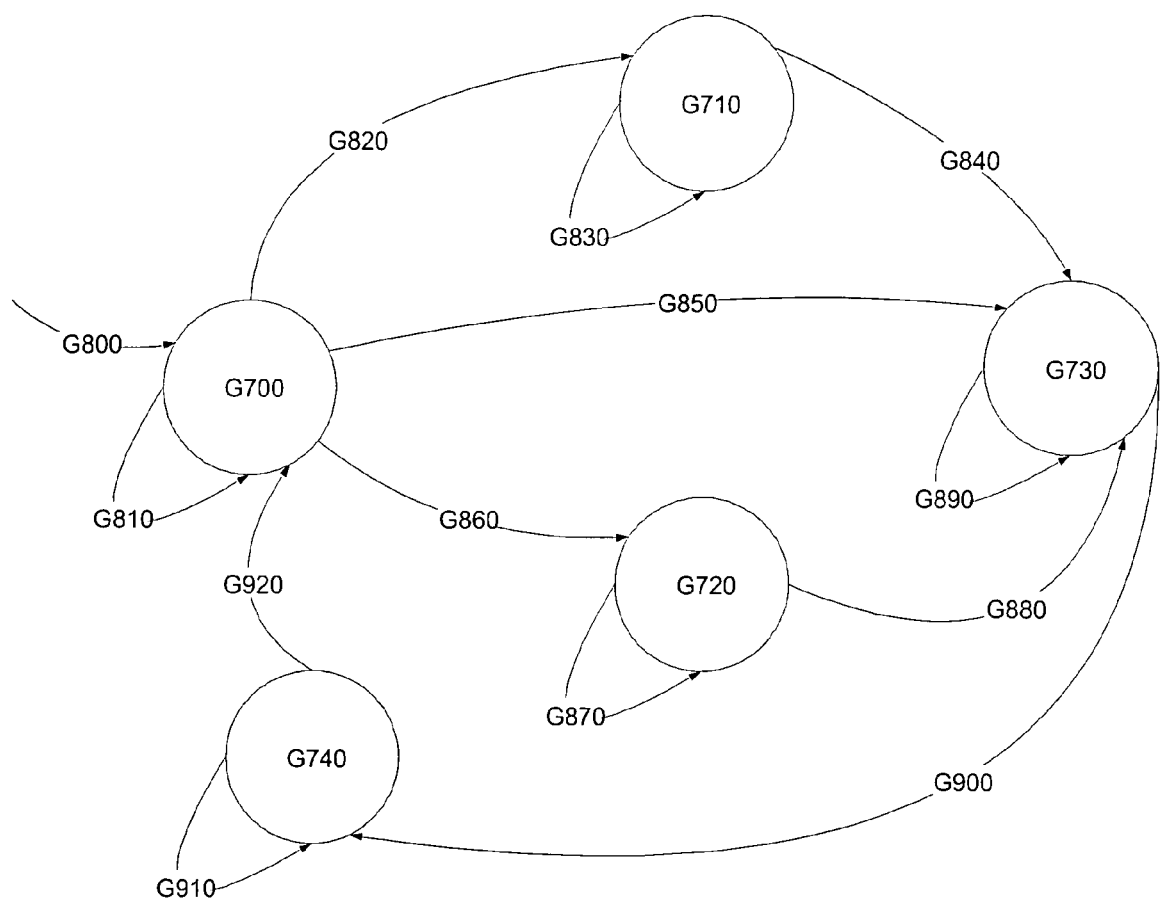

FIG. 10 shows a finite state machine, which represents the switchover between a performance and a compare mode.

Figure 11:
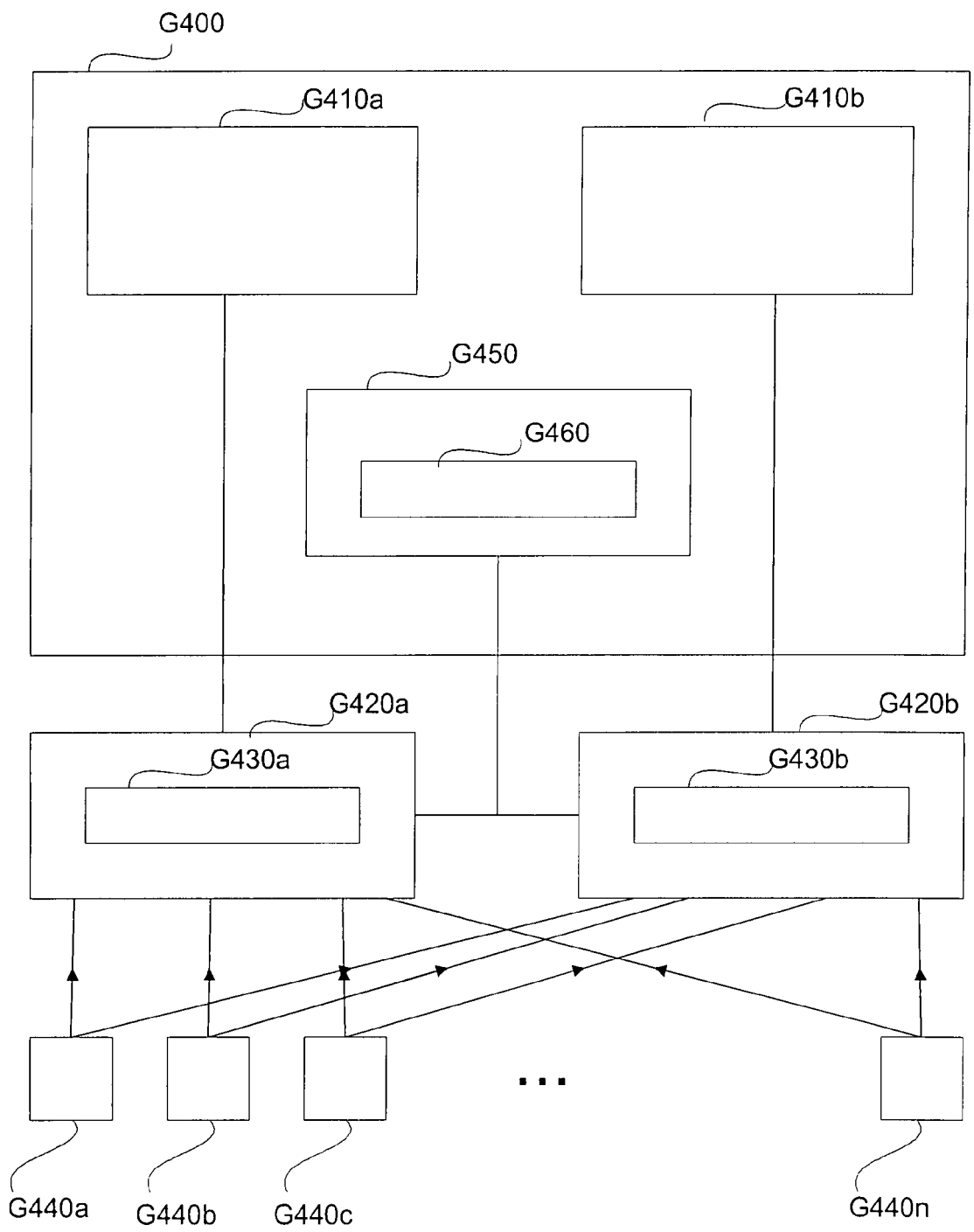

FIG. 11 shows a multiprocessor system G400 having two execution units as well as two interrupt controllers G420a, G420b, including interrupt masking registers G430a, G430b contained therein, and various interrupt sources G440a through G440n.

Figure 12:
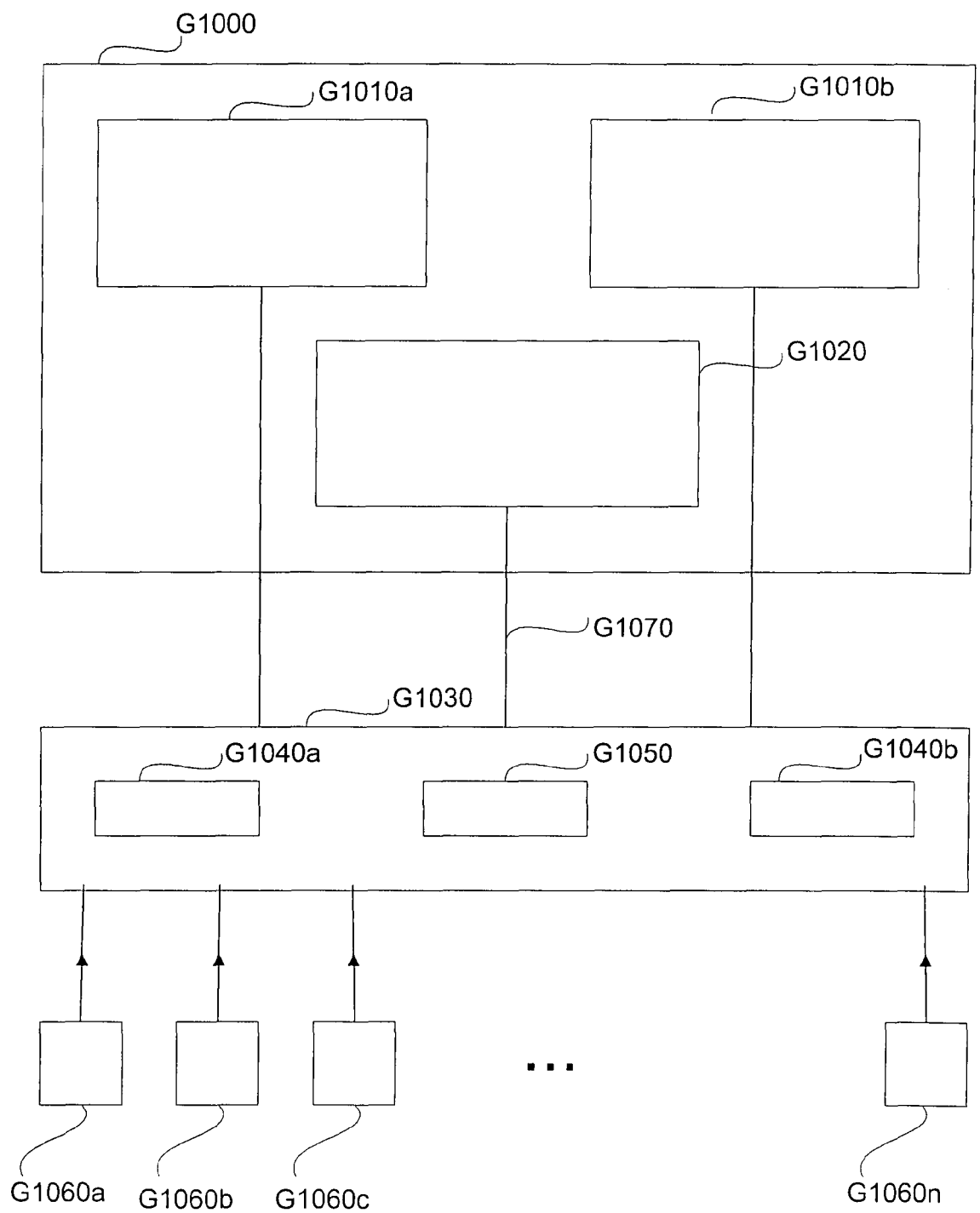

FIG. 12 shows a multiprocessor system having two execution units, a switchover and compare unit, and an interrupt controller having three register records.

Figure 13:
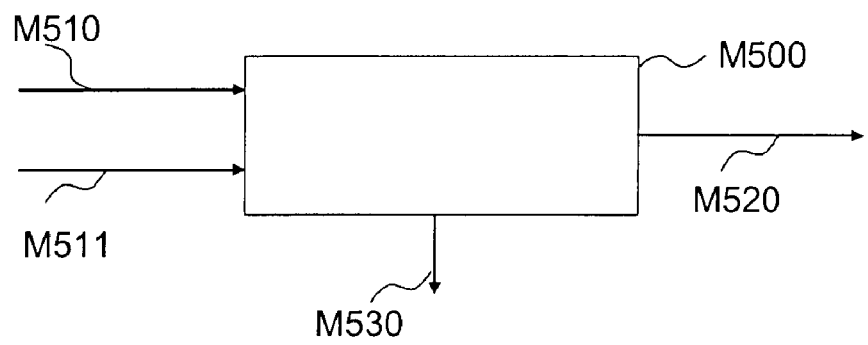

FIG. 13 shows an example form of a comparator.

Figure 14:
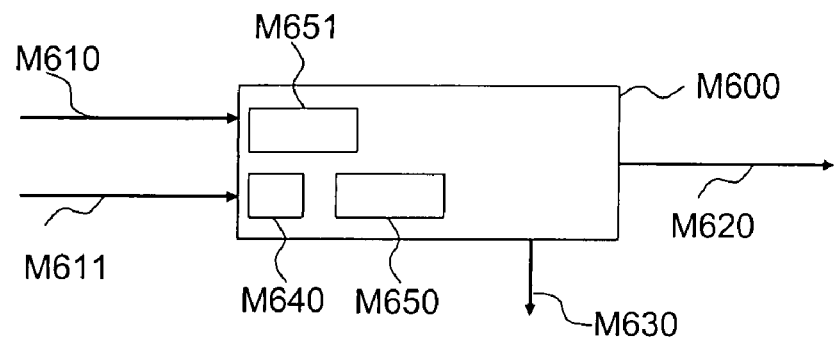

FIG. 14 shows a comparator having a unit to compensate for a phase shift.

Figure 15:
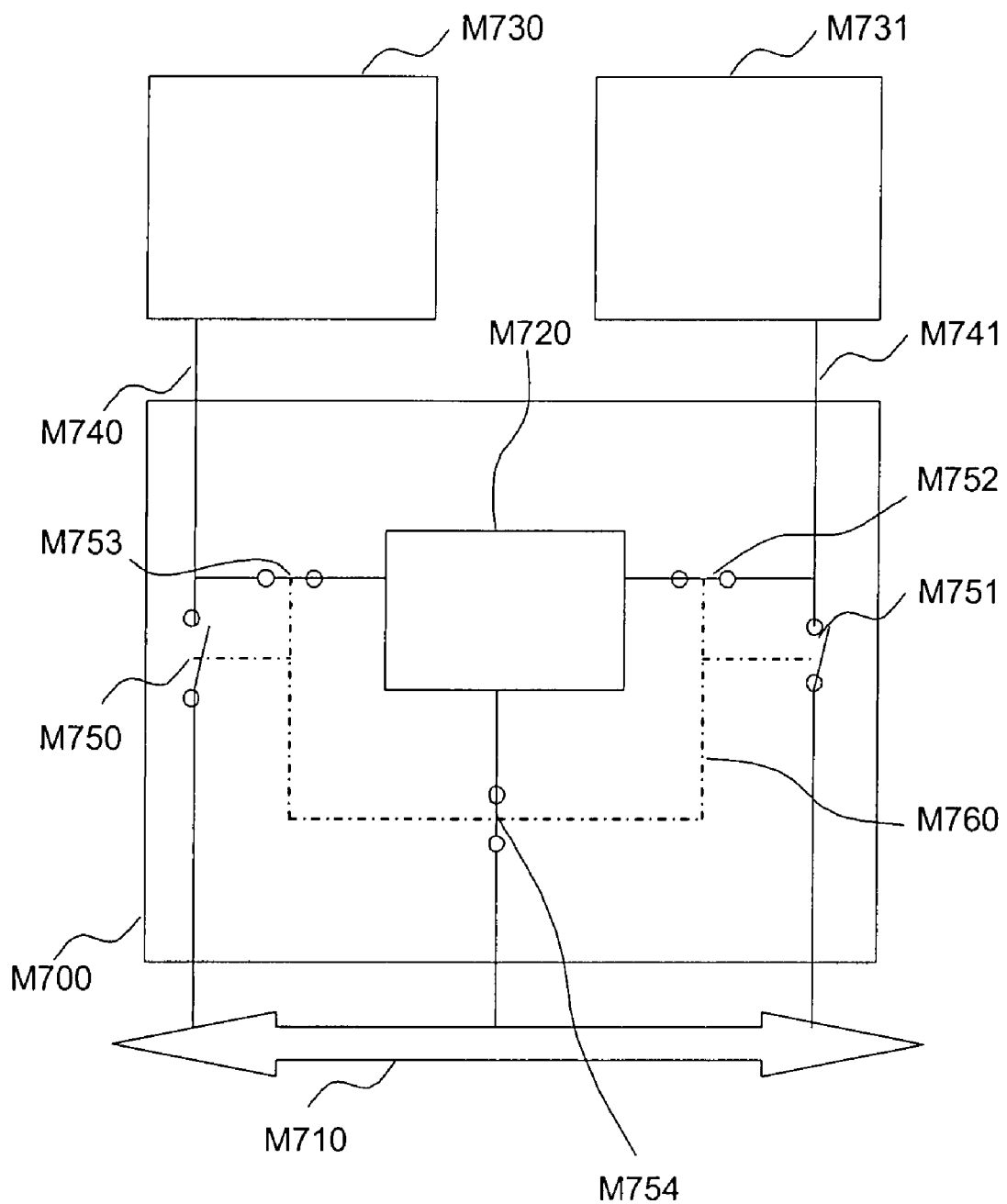

FIG. 15 depicts the behavior in principle of component M700 (switchover and compare unit) in the compare mode.

Figure 16:
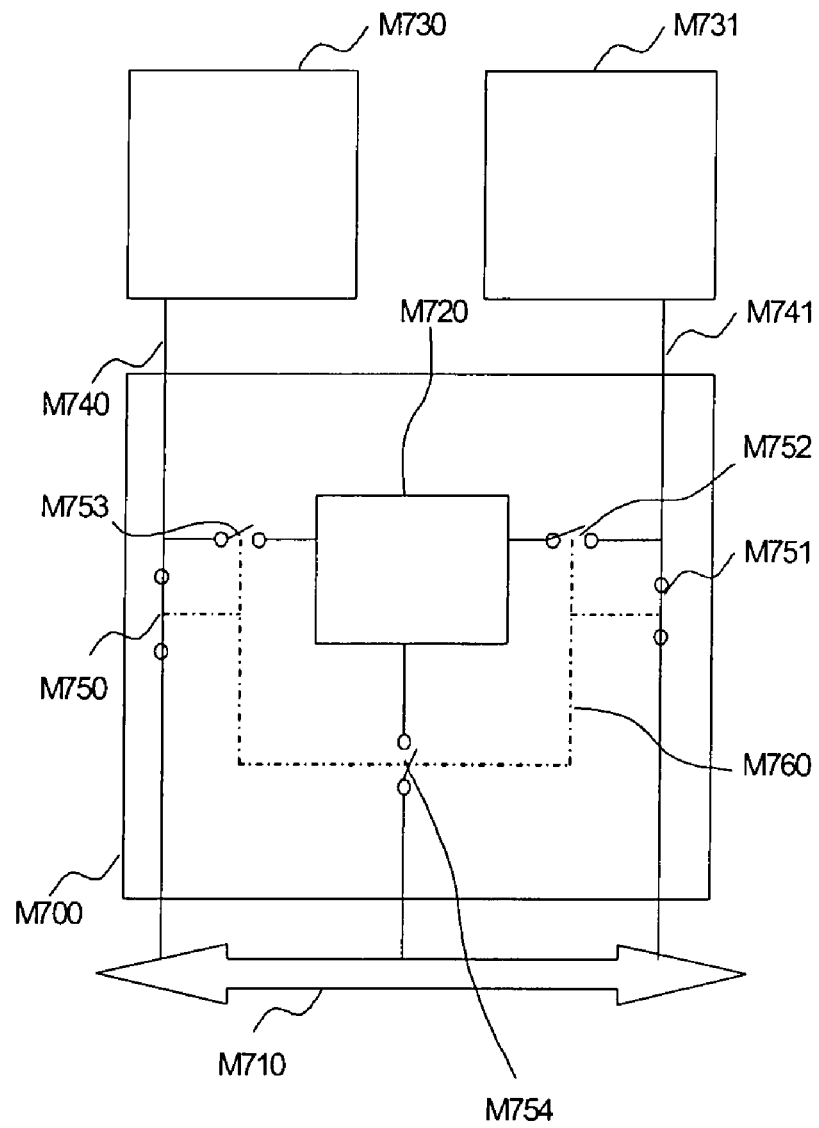

FIG. 16 depicts the behavior in principle of component M700 (switchover and compare unit) in the performance mode.

Figure 17:
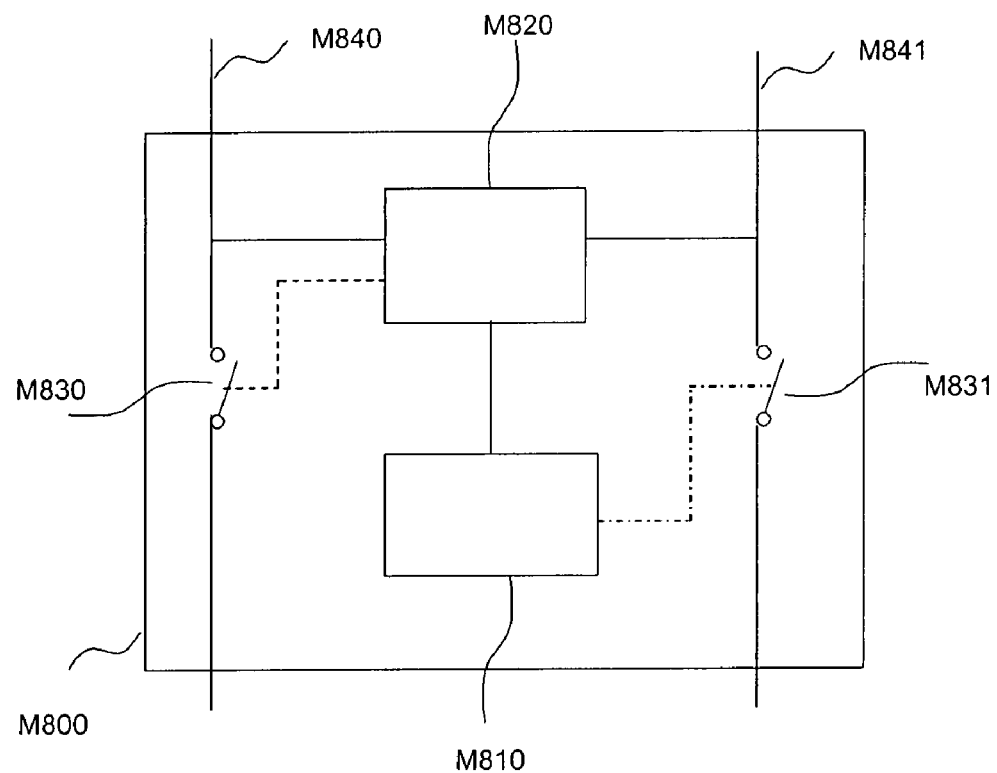

FIG. 17 shows an example embodiment of the switchover and compare unit.

Figure 18:
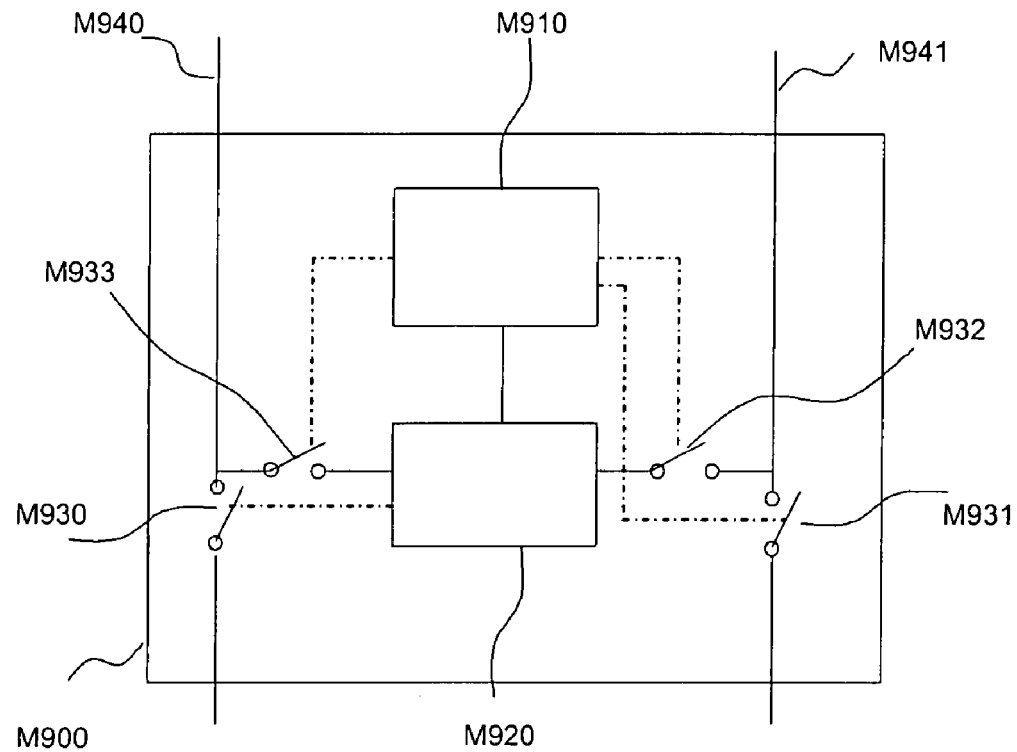

FIG. 18 shows another example embodiment of the switchover and compare unit.

Figure 19:
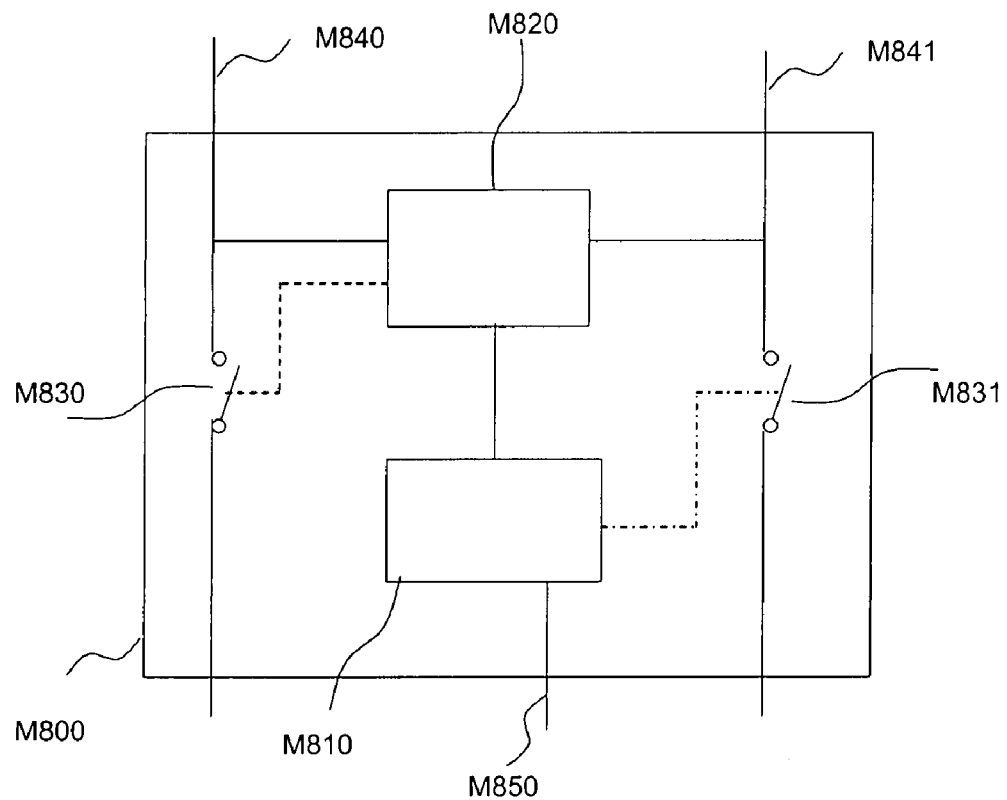

FIG. 19 shows a switchover and compare unit which generates a mode signal.

Figure 20:
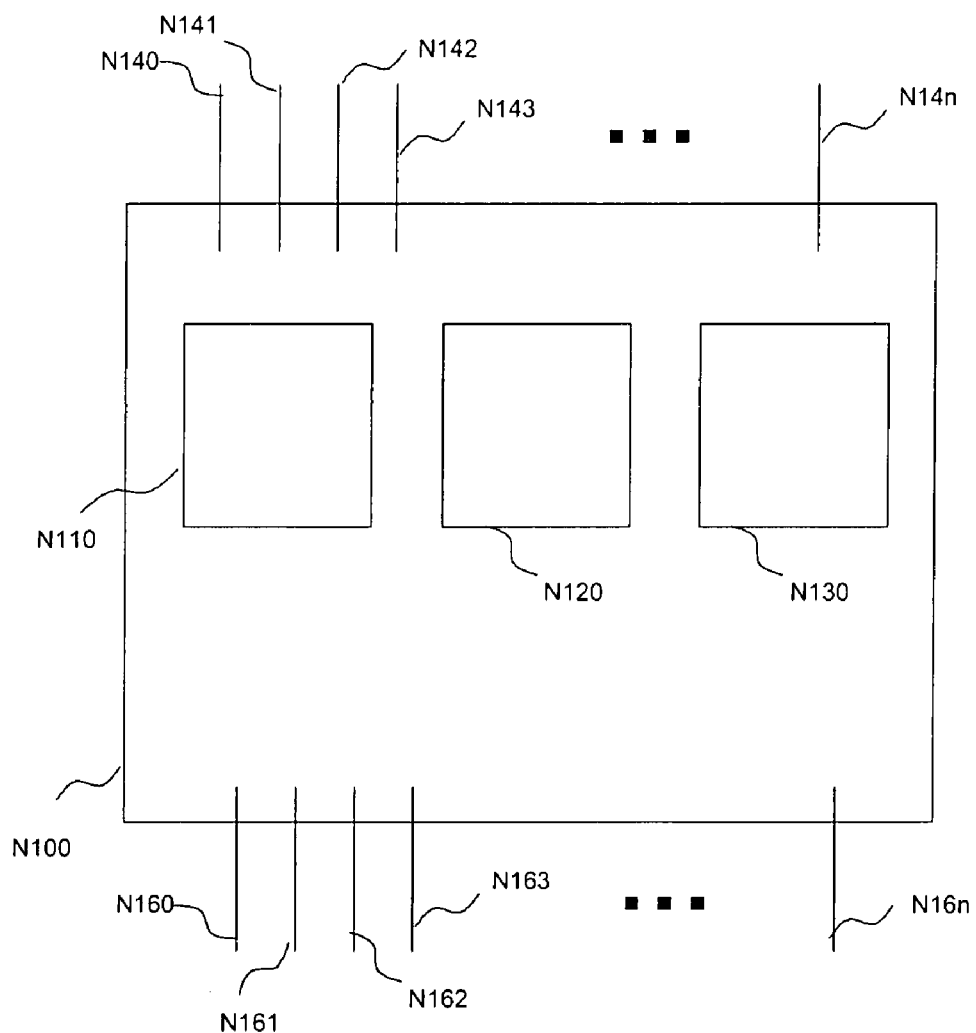

FIG. 20 shows a general depiction of a switchover and compare unit.

Figure 21:
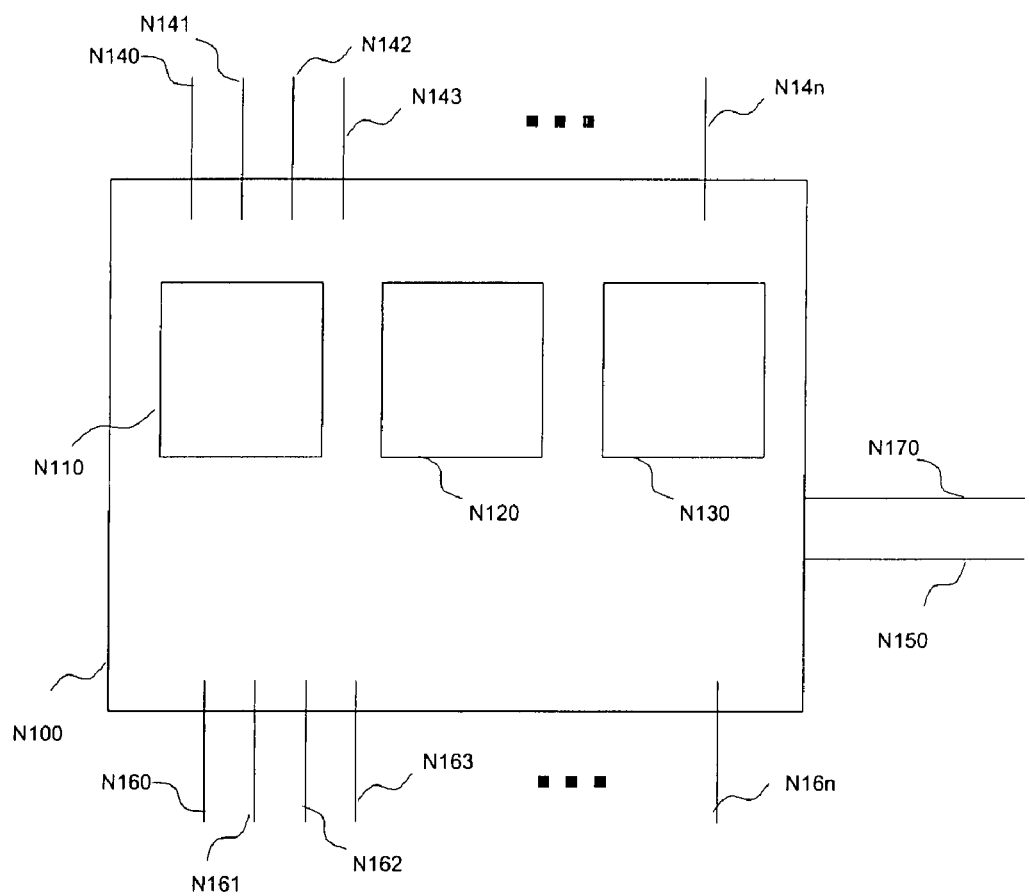

FIG. 21 shows a general depiction of a switchover and compare unit, which generates a general mode and a general fault signal.

Figure 22:
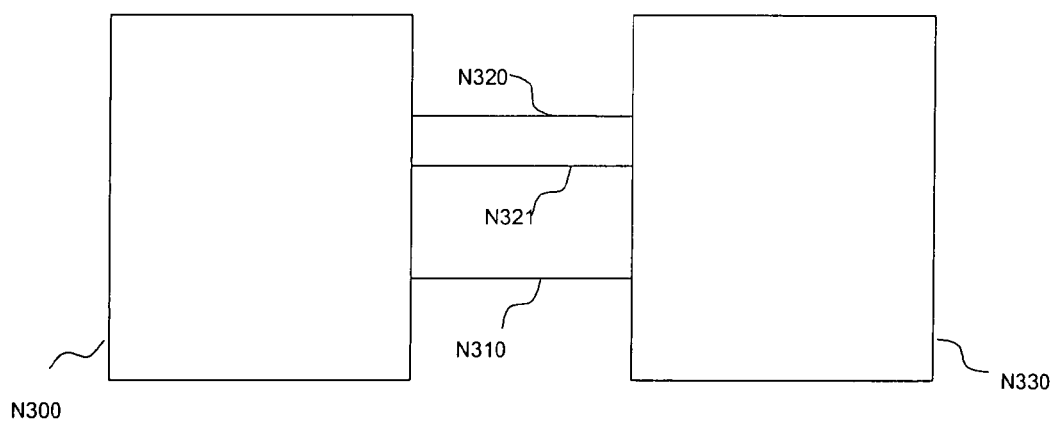

FIG. 22 shows the query/response communication with an external unit.

Figure 23:
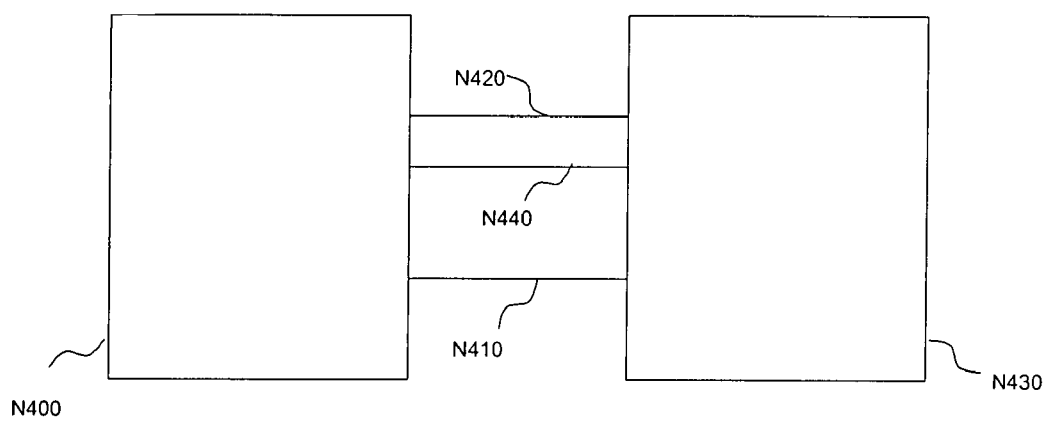

FIG. 23 illustrates the communication with an intelligent actuator.

DETAILED DESCRIPTION OF THE INVENTION

In the following text, both a processor, a core, a CPU, as well as an FPU (floating point unit), a DSP (digital signal processor), a coprocessor or an ALU (arithmetic logical unit) may be denoted as execution unit.

Figure 1:
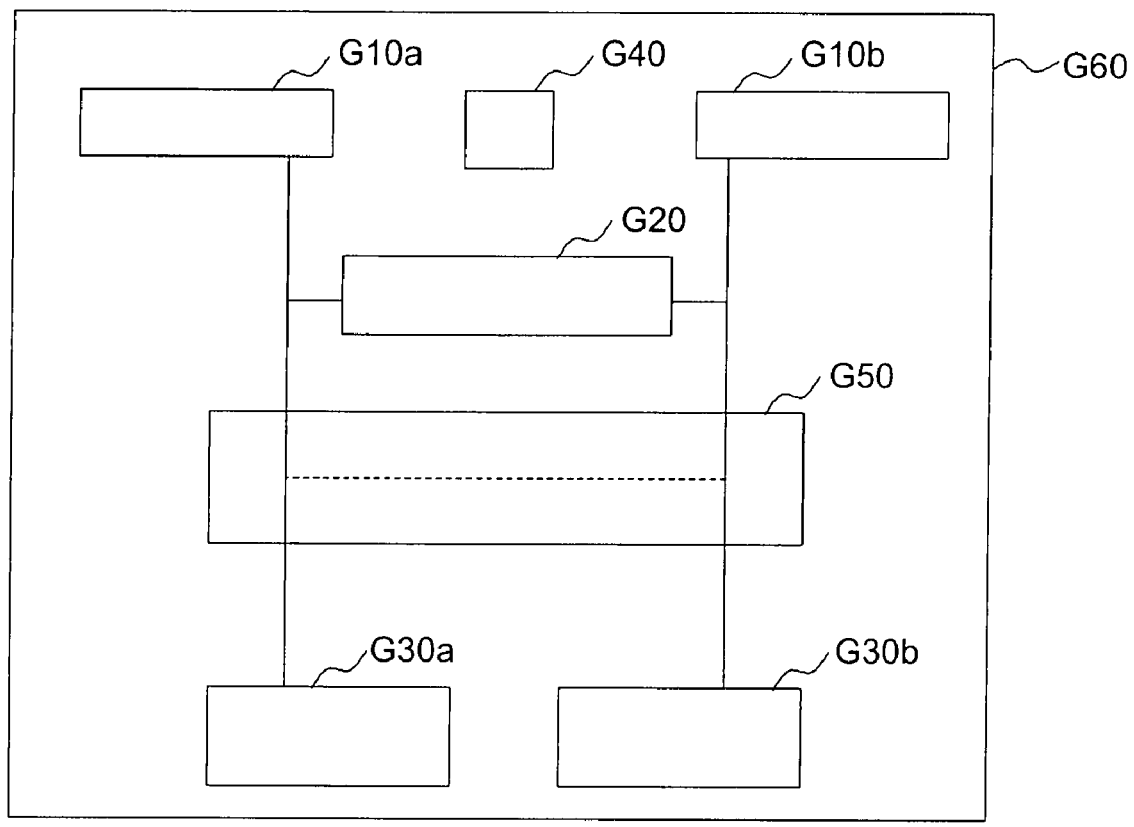
FIG. 1 shows a multiprocessor system G60 having two execution units G10a, G10b, a compare unit G20, a switchover unit G50, and a unit for detecting a switchover request G40.

FIG. 1 shows a multiprocessor system G60 having two execution units G10a, G10b, a compare unit G20, a switchover unit G50, and a unit for recognizing a switchover request G40.

Figure 2:
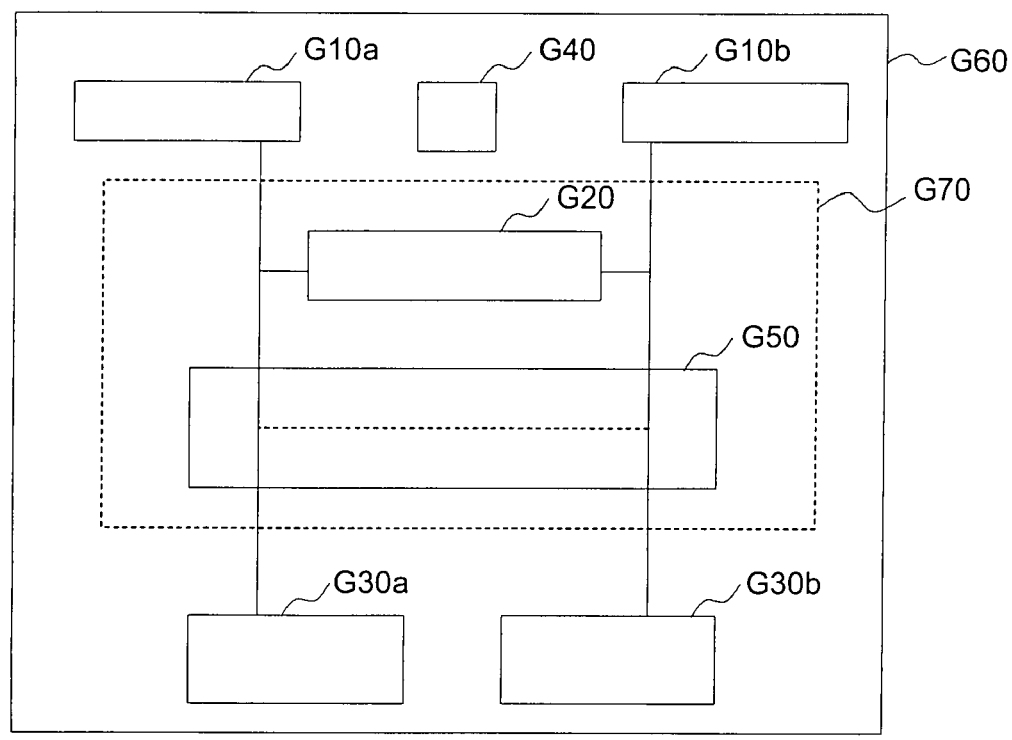
FIG. 2 shows a multiprocessor system G60 having two execution units G10a, G10b, a combined compare and switchover unit G70 made up of a compare unit G20 and a switchover unit G50, as well as a unit for detecting a switchover request G40.
Figure 3:
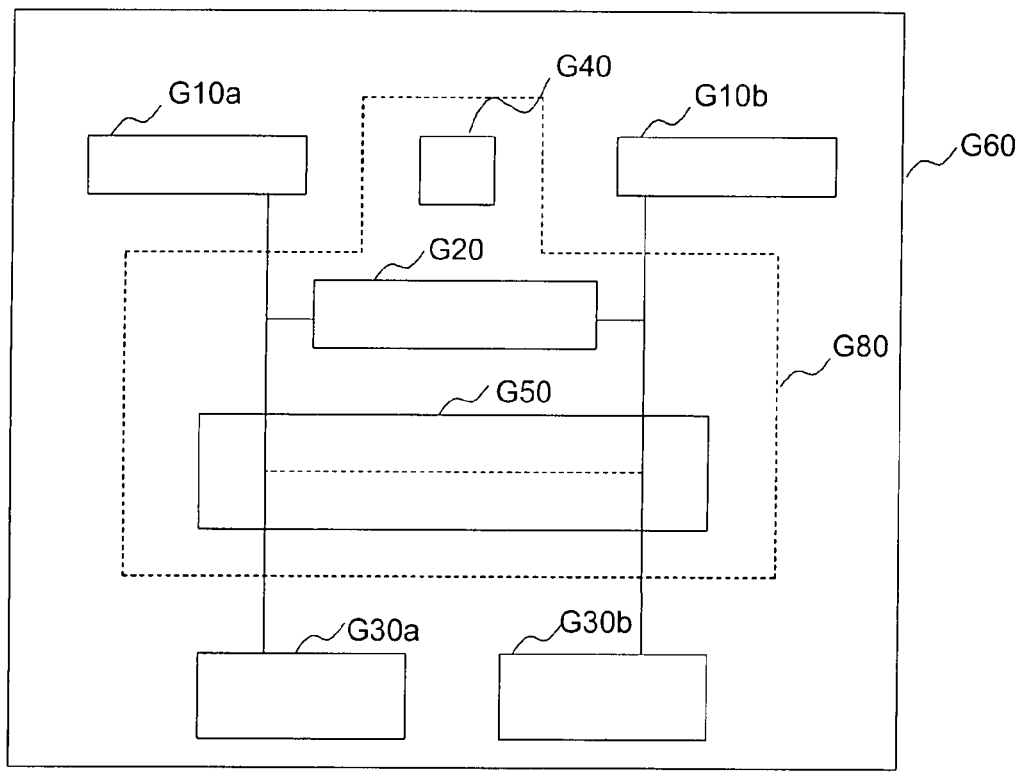
FIG. 3 shows a multiprocessor system G60 having two execution units G10a, G10b, a combined requested switchover detection, comparison and switchover unit G80 made up of a compare unit G20 and a switchover unit G50 and a unit for recognizing switchover request G40.

The present invention relates to a multiprocessor system G60 shown in FIG. 1, FIG. 2 and FIG. 3, having at least two execution units G10a, G10b, a compare unit G20, a switchover unit G50, and a unit for recognizing a switchover request G40. Switchover unit G50 has at least two outputs to at least two system interfaces G30a, G30b. Registers, memories or peripherals such as digital outputs, digital-to-analog converters and communication controllers are able to be controlled via these interfaces. This multiprocessor system is able to be operated in at least two operating modes, a compare mode (CM) and a performance mode (PM).

In the performance mode, different instructions, program segments or programs are executed in parallel in the different execution units. Compare unit G20 is deactivated in this operating mode. In this operating mode, switchover unit G50 is configured in such a way that each execution unit G10a, G10b is connected to a system interface G30a, G30b. Execution unit G10a is connected to system interface G30a, and execution unit G10b is connected to system interface G30b.

In the compare mode, identical or substantially identical instructions, program segments or programs are processed in both execution units G10a, G10b. These commands are advantageously processed in clock-controlled synchronism, but processing with asynchronism or a defined clock pulse offset is also conceivable. The output signals of execution units G10a, G10b are compared in compare unit G20. In response to a difference, a fault is imposed and suitable measures are able to be taken. These measures may trigger a fault signal, initiate a fault-handling procedure, actuate switches, or they may be a combination of these and other conceivable measures. In one variation, switchover unit G50 is configured in such a way that only one signal is put through to system interfaces G30a, G30b. In another configuration, the switchover unit causes only the compared and therefore identical signals to be put through to system interfaces G30a, G30b.

Independently of the mode active at the moment, switchover request detection unit G40 detects a wish to switch to another mode.

FIG. 2 shows a multiprocessor system G60 having two execution units G10a, G10b, a combined compare and switchover unit G70 made up of a compare unit G20 and a switchover unit G50, and a unit for switchover request detection G40.

In one example embodiment of the situation described above, switchover unit G50 and compare unit G20 may be combined to form one common switchover and compare unit (SCU) G70, as shown in FIG. 2. This common component G70 then takes over the tasks of individual components G50, G20. FIGS. 15, 16, 17, 18 and 19 show embodiment variants of SCU G70.

In another example embodiment as shown in FIG. 3, the unit for switchover request detection G40, comparator G20 and switchover unit G50 may be combined into one common component G80. In a further specific embodiment not shown in a figure, switchover request detection unit G40 and comparator G20 may be combined into one common component. A combination of switchover request recognition unit G40 with switchover unit G50 in one common component is likewise conceivable.

If not otherwise indicated, in the further text it is assumed that a switchover request detection unit G40 and a combined switchover and compare unit G70 are present.

A general case of the switchover and compare component, which may also be used for more than two execution units, is shown in FIG. 20. Of the n execution units to be considered, n signals N140, ..., N14n are transmitted to switchover and compare component N100. From these input signals, this component is able to generate up to n output signals N160, ..., N16n. In the simplest case, the "pure performance mode", all signals N14i are gated onto the corresponding output signals N16i. In the opposite borderline case, the "pure compare mode," all signals N140, ..., N14n are routed to only precisely one of output signals N16i.

This figure illustrates how the various conceivable modes may be produced. To this end, the logic component of a switching logic N110 is included in this figure. This component does not have to exist as a separate component. Crucial that the functions described be realized in the system. Switching logic N110 first of all determines how many output signals there actually are. It also determines which of the input signals contribute to which of the output signals. In this context, one input signal may contribute to precisely one output signal. Formulated mathematically, the switching logic thus defines a function that assigns one element of set {N160, ..., N16n} to each element of set {N140, ..., N14n}.

Processing logic N120 then determines for each of the outputs N16i, in what form the inputs contribute to this output signal. This component, as well, does not necessarily need to exist as a separate component. Decisive, again, is that the described functions be realized in the system. To describe the different possible variations exemplarily, it is assumed, without limiting universality, that output N160 is generated by signals N141, ..., N14m. If m=1, this simply corresponds to the signal being switched through; if m=2, then signals N141, N142 are compared, as described, for example, with regard to the comparator in FIGS. 13 and 14. This comparison may be implemented synchronously or asynchronously; it may be performed on a bit-by-bit basis, or only for significant bits or also using a tolerance range.

If m>=3, there are several possibilities.

A first possibility is to compare all signals and, given the presence of at least two different values, to detect a fault, which optionally may be signaled.

A second option provides for making a k-out-of-m selection (k>m/2). This may be implemented through the use of comparators. A fault signal may optionally be generated if one of the signals is determined to be deviant. A fault signal, possibly different from it, may be generated if all three signals are different.

A third option provides for supplying these values to an algorithm. This may take the form of generating an average value, a median value, or of using a fault-tolerant algorithm (FTA), for example. Such an FTA is based on deletion of the extreme values of the input values and on a type of averaging of the remaining values. This averaging may be carried out over the entire quantity of remaining values, or preferably over a subset easily formed in HW. In such a case, it is not always necessary to actually compare the values. In the averaging operation, it is merely necessary to add and divide, for example; FTM, FTA or median value generation require partial sorting. If appropriate, a fault signal may optionally be output here as well, given sufficiently high extreme values.

For the sake of brevity, these various mentioned options for processing a plurality of signals to form one signal are described as compare operations.

Thus, the task of the processing logic is to establish the exact form of the compare operation for each output signal, and thus for the corresponding input signals as well. The combination of the information of switching logic N110 (that is, the function named above) and the processing logic (that is, the establishment of the comparison operation per output signal, that is per functional value) is the mode information, and this determines the mode. Generally, this information is of course multi-valued, i.e., not representable by only one logic bit. Not all theoretically conceivable modes are practical in a given implementation; the number of permitted modes will be limited. It is important to note that, in the case of only two execution units, where there is only one compare mode, the entire information may be condensed into only one logic bit.

A switch from a performance mode to a compare mode is generally characterized by the fact that execution units, which are mapped to different outputs in the performance mode, are mapped to the same output in the compare mode. Preferably, this is realized in that there is a subsystem of execution units in which, in the performance mode, all input signals N14i that are to be taken into account in the subsystem are switched directly to corresponding output signals N16$i$, while in the compare mode, they are all mapped to one output. Alternatively, such a switchover operation may also be implemented by altering pairings. It is thereby clarified that, in the general case, one cannot speak of the one performance mode and the one compare mode, although in a given form of the invention it is possible to limit the quantity of modes allowed so that this is the case. However, one can always speak of a switchover from a performance mode to a compare mode (and vice versa).

Software-controlled switchover operations between these modes may be dynamically carried out during operation. In this context, the switchover is triggered either by the execution of special switchover instructions, special instruction sequences, explicitly identified instructions or by the access to specific addresses by at least one of the execution units of the multiprocessor system.

Fault circuit logic N130 collects the fault signals generated by the comparators, for instance, and optionally is able to switch outputs N16$i$ to passive by interrupting them via a switch, for instance.

However, for the most part, the following examples focus on the case of two execution units, based on which most concepts can be presented more easily.

The switchover between the modes may be coded by various methods. In one possible method, special switchover instructions may be employed, which are detected by the unit for switchover request detection G40. Another possible method for coding the switchover is defined by the access to a special memory area, which is again detected by the unit for switchover request detection G40. A further method interprets an external signal, which signals a switchover, in the unit for switchover request detection G40. In the following text, a method is described that utilizes bit combinations not used in the existing instruction set of the processor. A special advantage of this method is that existing development environments (assembler, compiler, linker, debugger) may continue to be used.

Figure 4:
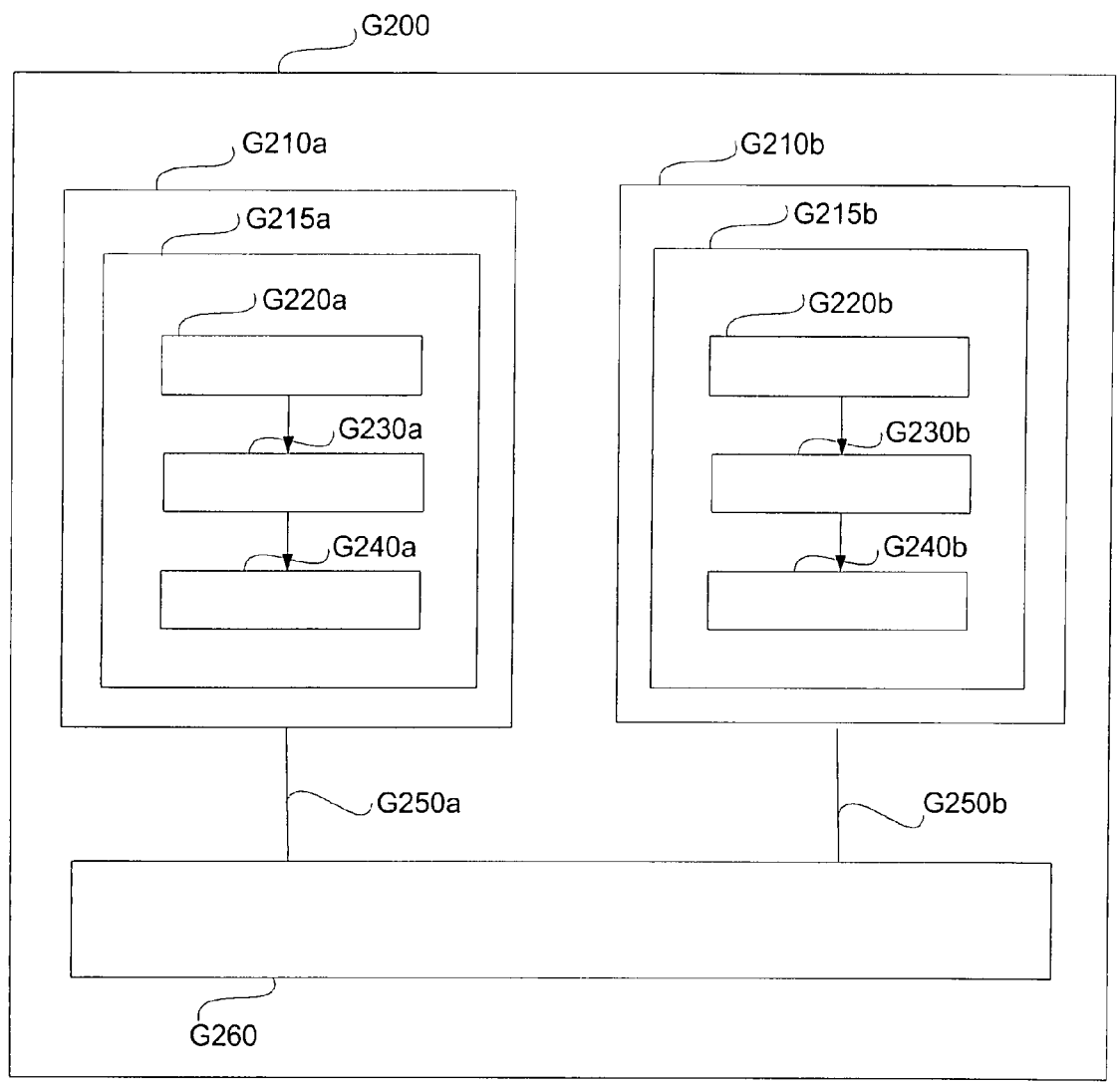
FIG. 4 shows a multiprocessor system G200 having two execution units G210a, G210b of a switchover and compare unit G260.

FIG. 4 shows a multiprocessor system G200 having two execution units G210$a$, G210$b$ and a switchover and compare unit G260. To switch between a compare mode and a performance mode (and vice versa), bit combinations of the at least two execution units G210$a$, G210$b$ not defined in the assembler are used. To be understood as not defined or undefined bit combinations in this sense are all bit combinations that are specified as undefined or illegal in the description of the instruction set. They are, for example, illegal operand, illegal instruction, illegal operation. A general feature of these undefined bit combinations is that a normal execution unit either generates a fault signal or exhibits a non-defined behavior in the execution of such a bit combination. These bit combinations are therefore not needed to describe the semantics of an ordinary program.

Consequently, the existing development environment as it exists for single-processor systems may be used for the software development. This can be realized, for example, by defining a macro "SWITCH MODE TO PM" and a macro "SWITCH MODE TO CM", which inserts corresponding bit combinations, undefined in the sense defined above, at a suitable place in the code.

The use of this combination is then defined as a general "SWITCH" macro. Depending on the present mode, this macro then brings about a change to the other respective mode. If more than two different modes exist in the system, more such combinations must be available in order to use this method; preferably one per mode may then be used for the switchover identification.

According to the present invention, the switchover request is coded by a bit combination not defined in the instruction set. It must not be processed within an execution unit G210$a$ G210$b$ in the usual manner. For this reason, an additional pipeline stage (REPLACE stage) G230$a$, G230$b$ is provided, which recognizes the corresponding bit combinations and replaces them by neutral bit combinations for further processing. The "NOP" (No Operation) instruction is advantageously used for that purpose. An NOP instruction has the feature that it does not alter the internal state of the execution unit, except for the instruction pointer. REPLACE stage G230$a$, G230$b$ is inserted after the usually first level, the FETCH level G220$a$ G220$b$, and before remaining pipeline stages G240$a$, G240$b$, bit combinations, not defined in the assembler, which are combined in one unit here.

According to the present invention, the implementation shown here of a unit for switchover request detection G40 as a special pipeline stage G230$a$, G230$b$ in a pipeline unit G215$a$, G215$b$ will generate an additional signal G250$a$, G250$b$ when a corresponding bit combination for a switchover has been detected, which signals to a separate switchover unit and compare unit G260 that the processing mode is to be changed.

REP stages G230$a$, G230$b$ are disposed between FETs G220$a$, G220$b$ and remaining pipeline stages G240$a$, G240$b$ in pipeline units G215$a$, G215$b$ of execution units G210$a$, G210$b$. REP levels G230$a$, G230$b$ recognize the corresponding bit combinations and, in this case, relay NOP instructions to remaining stages G240$a$, G240$b$. At the same time, respective signal G250$a$ or G250$b$ is activated. In all other cases, REP stages G230$a$, G230$b$ behave neutrally, that is, all other instructions are passed on to remaining stages G240$a$, G240$b$ in unchanged form.

FIG. 5 shows in a flow chart a method which, within a special pipeline stage G230$a$, G230$b$, exchanges a special undefined bit combination with an NOP or other neutral bit combination. In FETCH stage G300, an instruction, that is, a bit combination, is fetched from the memory. Thereupon, in block G310, it is decided whether the fetched bit combination corresponds to the special undefined bit combination that codes a switchover. If this is not the case, in the next step G320, the bit combination is transferred without change to remaining pipeline stages G340 for further processing. If the special bit combination that codes a switchover has been recognized in step G310, it is replaced in step G330 by the NOP bit combination, and this is then transferred to further pipeline stages G340 for further processing. In one advantageous example embodiment, blocks G310, G320, G330 represent the functionality of a REPLACE stage G230$a$, G230$b$ according to the present invention; they may also include further functionality.

FIG. 6 shows a multiprocessor system H200 having two execution units H210$a$, H210$b$ and a switchover and compare unit H260. Components H220$a$, H220$b$, H240$a$, H240$b$ have the same significance as G220$a$, G220$b$, G240$a$, G240$b$. In an alternative design of the unit for switchover request detection G40, described here by special pipeline stages H230$a$, H230$b$, it has further signals in addition to signals H250$a$, H250$b$, which signal a switchover. In order to allow synchronization of execution units H210$a$, H210$b$ during the change from the performance mode to the compare mode, pipeline units H215$a$, H215$b$ of execution units H210$a$, H210$b$ each have a signal input H280$a$, H280$b$ by which the processing may be stopped. This signal is set by switchover and compare unit H260 for the particular pipeline unit H215$a$ or H215$b$ that has recognized a switchover instruction first, and thereby has activated signal H250$a$ or H250$b$. Only when both pipeline units H215*a*, H215*b* of execution units H210*a*, H210*b* have recognized the switchover request and have synchronized their internal states by software or further hardware measures, will this signal H280*a*, H280*b* be canceled again. H280*a*, H280*b* are not needed in the change from compare mode to performance mode since no synchronization is necessary.

A prerequisite for the proposal described here is a unit (known as ID unit) or method via which each execution unit is able to ascertain its individual number or unit ID. For example, in a system having two execution units, one execution unit may ascertain for itself the number 0, the other the number 1. In a system having more than two execution units, the numbers are assigned and, respectively, ascertained correspondingly. This ID does not make the distinction between a compare mode and a performance mode, but denotes an execution unit having a one-to-one correspondence. The ID unit may be contained in the respective execution units, for example, be implemented as a bit or bit combination in the processor status register or as a separate register or as a single bit or as a unit external to the execution units, which supplies a corresponding ID upon request.

After the execution units have switched to the performance mode in accordance with a switchover request, the compare unit is actually no longer active, yet the execution units still execute the same instructions. This is due to the fact that the instruction pointers, which indicate the place in the program at which an execution unit will work in the next step or is working at present, are not affected by the switchover. To permit the execution units to subsequently execute different SW modules, the program run of the execution units must be separated. Depending on the task, as a rule, the instruction pointers therefore have different values in the performance mode, since independent instructions, program segments or programs are processed according to the present invention. In the proposal described here, the program flows are separated by ascertaining the respective execution unit number. Depending on the ID of an execution unit, the execution unit executes a specific software module. Since each execution unit has an individual number or ID, the program flow of the participating execution units is able to be separated in a reliable manner.

FIG. 7, in a flow chart, depicts a method that illustrates how, with the aid of the unit ID, the program flow can be separated when changing from a compare mode to a performance mode in a multiprocessor system having two execution units. After the switchover from a compare mode to a performance mode has been executed G500, a query of the unit ID or execution unit number G510 is performed by both execution units. In this context, in accordance with the present invention, execution unit 0 receives execution unit number 0, and execution unit 1 receives execution unit number 1. In G510, the ascertained execution unit number is compared to number 0. If they are the same, that execution unit for which this comparison was successful continues in step G520, using the code for execution unit 0. The execution unit for which this comparison was not successful, continues in G 530 with the comparison to number 1. If this comparison is successful, it is continued with the code for execution unit 1 in G540. If this comparison is not successful, an execution unit number unequal to 0 and 1 was therefore ascertained for the corresponding execution unit. This represents a fault case, and the method continues with G550.

FIG. 8 describes an example method for three execution units. After the switchover from a compare mode to a performance mode has been executed H500, the execution units perform a query of the unit ID or execution unit number H510. In accordance with the present invention, for example, execution unit 0 receives execution unit number 0, execution unit 1 execution unit number 1, and execution unit 2 execution unit number 2. In H510, the ascertained execution unit number is compared to the number 0. If they are the same, that particular execution unit for which this comparison was successful continues in step H520, using the code for execution unit 0. The execution units for which this comparison was not successful continue in H530 with the comparison to the number 1. The execution unit for which this comparison is successful continues with the code for execution unit 1 in H540. The execution units for which this comparison was not successful continue in H535 with the comparison to the number 2. The execution unit for which this comparison is successful continues with the code for execution unit 2 in H536. If this comparison was not successful, an execution unit number unequal to 0, 1 and 2 was therefore ascertained for the corresponding execution unit. This represents a fault case, and the method is continued with H550. As an alternative to the comparison with a number, the ascertained execution unit number may also be used directly as an index in a branch table.

According to this description, this method may also be used for multiprocessor systems having more than three execution units.

In a switch from performance mode to compare mode several aspects must be taken into consideration. In the switch from performance mode to compare mode, it must be ensured that the internal states of the execution units are similar following the switchover; otherwise, in the compare mode, a fault would possibly be imposed if the different starting states lead to different outputs. This may be accomplished by hardware, by software, by firmware or by a combination of all three. A prerequisite for this is that all execution units execute identical or similar instructions, programs or program segments after the switchover to the compare mode. A synchronization method is described in the following text, which is able to be used when the compare mode has the feature that identical instructions are processed and a comparison that is precise to one bit is carried out.

FIG. 9, in a flow chart, illustrates a method that synchronizes the execution units in the switchover from a performance mode to a compare mode. In step G600, all interrupts are inhibited. This is important not only because the interrupt controllers must be suitably reprogrammed for the compare mode. The internal state of the execution units should be adapted by software as well. However, if an interrupt is triggered during the preparation for the switchover to the compare mode, then an adaptation is no longer possible without extra measures.

Step G610: If the two execution units have separate caches, then the contents of the caches must be adapted as well prior to the switchover in order to prevent that, in the compare mode, a cache hit occurs for an address for the one execution unit and a cache miss occurs for the other execution unit. If this is not implemented independently by the cache hardware, it can be accomplished, for example, by marking all cache lines as invalid. It is necessary to wait until the cache (or the caches) is/are completely invalid. If necessary, this may be ensured by a wait loop in the program code. It may also be achieved by other means; however, it is crucial that the caches be in the same state after this step.

In step G620, the write buffers of the execution units are emptied, so that following the switchover, no activities of the execution units take place which still stem from the performance mode.

In step G630, the state of the pipeline stages of the execution units is synchronized. For this purpose, an appropriate number of NOP (no operation) instructions is executed before the switchover sequence/switchover instruction. The number of NOP instructions is a function of the number of pipeline stages, and is therefore dependent on the specific architecture. Which instruction is suitable as a NOP instruction is likewise a function of the architecture. If the execution units have an instruction cache, then it must be ensured that this instruction sequence is aligned at the boundaries of a cache line (alignment). Since the instruction cache has been marked as invalid prior to the execution of these NOPs, these NOPs must first be loaded into the cache. If this instruction sequence begins at a cache line boundary, then the data transfer from the memory (e.g., RAM/ROM/flash) to the cache will be completed before the instruction for the switchover takes place. This, too, must be taken into account when determining the necessary number of NOPs.

In step G640, the instruction step for the switchover to the compare mode is actually carried out.

In step G650, the contents of the respective register files of each execution unit are adapted. For this purpose, the registers must be loaded with identical contents before or after the switchover. In so doing, it is important that, following the switchover, the contents of a register in the execution units are identical before the register contents are transferred to the outside and thus compared by the compare unit.

In step G660, the interrupt controllers are reprogrammed, so that an external interrupt signal triggers the same interrupt for all interconnected execution units.

In step G670, the interrupts are enabled again.

If it is not clear from the program run when a switch to the compare mode is to occur, then the participating execution units must be informed about the intended switchover. An interrupt is initiated for this purpose, e.g., in the interrupt controllers associated with the respective execution units, e.g. by SW. The interrupt treatment then induces the execution of the afore-described sequence for the interconnection.

FIG. 10 shows a finite state machine, which represents the switchover between a performance and a compare mode (and vice versa). At the start of the system, caused by "power on" or also reset (software or hardware), the system is shifted into state G700 via transition G800. In general, it holds true that, following an undefined event which is able to trigger a reset, the system always begins to operate in state G700. Exemplary events that are able to trigger a reset are external signals, problems in the voltage supply or internal fault events that make further processing no longer useful. State G700 of switchover and compare unit G70 and also of multiprocessor system G60, during which work is carried out in the performance mode, is therefore the default state of the system. Default state G700 is assumed in all cases where an otherwise undefined state would be assumed. This default setting of state G700 is ensured by hardware measures. For example, the system state or the state of switchover and compare unit G60 may be coded in a register, in a bit in a register, by a bit combination in a register or by a flip-flop.

With the aid of hardware, it is then ensured that state G700 is always assumed after a reset or power on. This is ensured in that, for example, the reset signal or the "power on" signal is conducted to the reset input or the set input of the flip-flop or the register.

In state G700, the system operates in a performance mode. Execution units G10a, G10b thus process different instructions, programs or program pieces. A switchover request is able to be detected, for instance, in that an execution unit G10a, G10b executes a special switchover instruction. Other possibilities are a detection through the access to a special memory address, by an internal signal or also by an external signal. As long as there is no switchover request, multiprocessor system G60, and thus switchover and compare unit G70 as well, remains in state G700. In the following text, the switchover request denotes the detection of a switchover condition, which is characterized the way a switchover request is characterized in this special system.

The remaining in state G700 is represented by transition G810. If execution unit G10a detects a switchover request, then switchover and compare unit G70 is transferred into state G710 via transition G820. State G710 thus denotes the situation where execution unit G10a has detected a switchover request and is waiting until execution unit G10b likewise detects a switchover request. As long as this is not the case, switchover and compare unit G70 remains in state G710, which is shown by transition G830.

Transition G840 takes place when execution unit G10b also detects a switchover request in state G710. Switchover and compare unit G70 thereby assumes state G730. This state denotes the situation where both execution units G10a, G10b have detected a switchover request. In state G730, the synchronization methods are carried out, by which the two execution units G10a, G10b are synchronized relative to each other, so as to subsequently operate in compare mode. During this process, switchover and compare unit G70 remains in state G730, which is shown by transition G890.

If, in state G700, a switchover request is first detected by execution unit G10b, then there is a switch to state G720 via transition G860. State G720 therefore denotes the situation where execution unit G10b has detected a switchover request and is waiting until execution unit G10a likewise detects a switchover request. As long as this is not the case, switchover and compare unit G70 remains in state G720, which is shown by transition G870. Transition G880 takes place when execution unit G10a also detects a switchover request in state G720. The switchover and compare unit thereby assumes state G730.

If both execution units G10a, G10b detect a switchover request at the same time in state G700, the system immediately transitions into state G730. This case represents transition G850.

When switchover and compare unit G70 is in state G730, both execution units G10a, G10b have detected a switchover request. In this state the internal states of execution units G10a, G10b are synchronized, in order to operate in compare mode following termination of these synchronization procedures.

Transition G900 takes place upon termination of this synchronization work. This transition indicates the end of the synchronization. In state G740, execution units G10a, G10b operate in compare mode. The completion of the synchronization work may be signaled by execution units G10a, G10b themselves. This means that transition G900 takes place once both execution units G10a, G10b have signaled that they are ready to operate in compare mode. The termination may also be signaled via a fixedly set time. This means that the length of time for remaining in state G730 is permanently coded in switchover and compare unit G70. This time is set in such a way that, with certainty, both execution units G10a, G10b have completed their synchronization work. After this time has expired, transition G900 will be initiated. In one further variation, switchover and compare unit G70 is able to monitor the states of execution units G10a, G10b, and is itself able to detect when both execution units G10a, G10b have ended their synchronization tasks. Transition G900 is initiated following the detection.

As long as no switchover request is detected, multiprocessor system G60 remains in compare mode, represented by transition G910. When a switchover request is detected in state G740, the switchover and compare unit is shifted to state G700 via transition G920. As already described, the system operates in performance mode in state G700. The separation of the program flows may then be implemented during the transition from state G740 to state G700, as in the method described.

FIG. 11 shows a multiprocessor system G400 having two execution units G410a, G410b, as well as two interrupt controllers G420a, G420b, including interrupt masking registers G430a, G430b contained therein, and various interrupt sources G440a through G440n. Also shown is a switchover and compare unit G450 having a special interrupt masking register G460.

In an advantageous manner, each execution unit G410a, G410b has its own interrupt controller G420a, G420b in order to be able to handle two interrupts simultaneously in performance mode. This is especially advantageous in systems where the interrupt treatment represents a bottleneck in the system performance. In this context, interrupt sources G440a through G440n are advantageously connected to both interrupt controllers G420a, G420b in the same way. The result of this type of connection is that, without further measures, the same interrupt is triggered at both execution units G410a, G410b. In performance mode, interrupt controllers G420a, G420b are programmed in such a way that corresponding interrupt sources G440a through G440n are suitably distributed to the various execution units G410a, G410b according to the particular application. This is accomplished by suitable programming of interrupt masking registers G430a, G430b. The masking registers designate one bit in the register for each interrupt source G440a through G440n. If this bit is set, the interrupt is blocked, i.e., not routed to connected execution unit G410a, G410b. Advantageously, a given interrupt source G440a through G440n is processed by exactly one execution unit G410a or G410b in a performance mode. In an expedient manner, this applies to at least some of the interrupt sources. In this way it is possible to process a plurality of interrupt sources G440a through G440n simultaneously, without the occurrence of an interrupt nesting (an interrupt processing is interrupted by a second interrupt) or an interrupt pending (the processing of the second is postponed until the processing of the first one is finished).

In compare mode, it must be ensured that interrupt controllers G420a, G420b trigger the same interrupt simultaneously in all execution units G410a, G410b; otherwise a fault would be imposed in accordance with a compare mode. This means that it must be ensured in the synchronization phase, during the switchover from performance mode to compare mode, that interrupt masking registers G430a, G430b are identical. This synchronization is described in FIG. 9 in step G660. This synchronization may be implemented by software, by corresponding programming of both interrupt masking registers G430a, G430b with the same value. It is proposed to use a special register G460 to accelerate the switchover process. In one specific embodiment, this register G460 is disposed in switchover and compare unit G450, but it may also be included in switchover request detection unit G40, in a combined switchover request detection unit, in the comparator, in switchover unit G80, as well as in all combinations. It is equally conceivable to dispose this register at a different suitable location outside of these three components. Register G460 contains the interrupt masking, which is intended to be effective in the compare mode. Switchover and compare unit G450 receives from switchover request detection unit G40 a signal for the switchover from a performance to a compare mode. After the interrupts have been inhibited in step G600, interrupt masking registers G430a, G430b of interrupt controllers G420a, G420b can be reprogrammed. This will then be implemented via hardware by switchover and compare unit G450, in parallel with respect to the remaining synchronization steps, after the switchover signal has been received and interrupt controllers G420a, G420b have been blocked.

In an advantageous manner, interrupt masking registers G430a, G430b are not individually reprogrammed in the compare mode, but always the central register G460. It is then transferred synchronously, via hardware, to the two interrupt masking registers G430a, G430b. The method described here for one interrupt masking register may in the same manner be transferred to all interrupt status registers disposed in an interrupt controller. Naturally, instead of a register G460, it is also conceivable to use another storage medium from which a transfer can be made as quickly as possible to interrupt masking registers G430a, G430b.

In FIG. 12, a multiprocessor system G1000 is provided, which has two execution units G1010a, G1010b, a switchover and compare unit G1020, as well as an interrupt controller G1030 having three different register records G1040a, G1040b, G1050. As an alternative to the design approach described above, a special interrupt controller G1030 is provided as shown in FIG. 12. This is used in a multiprocessor system G1000, which is shown in the example with two execution units G1010a, G1010b, as well as a switchover and compare unit G1020, which is able to switch over between a compare mode and a performance mode.

In performance mode, register sets G1040a, G1040b are employed. In this case, interrupt controller G1030 operates exactly like two interrupt controllers G420a, G420b. This behavior is illustrated and described in FIG. 11. In the process, register record G1040a is assigned to execution unit G1010a, and register record G1040b is assigned to execution unit G1010b. Interrupt sources G1060a to G1060n are suitably distributed to execution units G1010a, G1010b, by masking. In the switch from a performance mode to a compare mode, switchover and compare unit G1020 generates a signal G1070. It signals to interrupt controller G1030 that there is a switch taking place to compare mode, i.e., that as of this moment, the system is operating in compare mode. Interrupt controller G1030 thereupon uses register record G1050. This ensures that the same interrupt signals are obtained at both execution units G1010a, G1010b. With a change from compare mode to performance mode, which is once again signaled to interrupt controller G1030 by switchover and compare unit G1020 via signal G1070, there is another switch to register records G1040a, G1040b. Advantageously, it is thereby also possible to protect the corresponding register records, in that, in performance mode, writing is allowed only to register records G1040a, G1040b, and writing to register record G1050, which is reserved for the compare mode, is prevented by hardware. The same is also possible in the opposite direction, namely that, in the compare mode, only writing on register set G1050 is allowed, and writing on register sets G1040a, G1040b is prevented.

FIG. 13 shows an example form of a comparator M500, G20. Comparator M500 is a component in a multiprocessor system G60 having at least two execution units G10a, G10b with a switchover between a performance mode and a compare mode. It is shown in the simplest form in FIG. 13. Comparator component M500 is able to receive two input signals M510 and M511. It then compares them for parity, e.g., in the sense of a bit parity in the context described here. In the case of parity, the value of input signals M510, M511 is applied to output signal M520, and fault signal M530 does not become active, i.e., it signals the status "good." If it detects disparity, fault signal M530 is activated. Signal M520 may then optionally be deactivated. This has the advantage that the fault does not get out of the corresponding system ("fault containment"). That is to say, other components situated outside of the execution units are not corrupted by the potentially faulty signal. However, there are also systems where signal M520 does not have to be deactivated. For example, this is the case when only fail-silence is required at the system level. The fault signal may then be conducted to the outside, for instance.

Starting from this basic system, a multitude of example embodiments is conceivable. To begin with, component M500 may be designed as a so-called TSC component (totally self checking). In this case, fault signal M530 is routed to the outside via at least two lines ("dual rail"). Also, in every possible case involving fault of the compare component, internal design and fault detection measures ensure that this signal is present in a correct or an identifiably incorrect form. In this context, a dual rail signal makes a binary signal available via two lines, so that the two lines are inverted relative to each other in a faultless case. One example variant in the utilization of the system according to the present invention is to use such a TSC comparator.

A second type of example embodiments may be distinguished by the degree of synchronism required of the two inputs M510, M511 (or M610, M611). One possible specific embodiment is characterized by synchronism with clock-pulse timing, that is, the data may be compared in one clock pulse.

A slight change is obtained in that, given a fixed phase shift between the inputs, a synchronous delay element is used, which delays the corresponding signals, by half-integral or integral clock-pulse periods, for example. Such a phase shift is useful to avoid common cause faults, that is, those causes of faults which are able to influence several processing units similarly and simultaneously.

Therefore, FIG. 14 depicts an additional example embodiment. Components and signals M600, M610, M611, M620, M630 have the same meaning as the corresponding components and signals M500, M510, M520, M530 in FIG. 13. Therefore, in addition to these components, component M640 is inserted in FIG. 14, which delays the input that is earlier in time, by the phase shift. This delay element is accommodated in the comparator, in order to use it only in compare mode.

Alternatively or additionally, temporary buffers M650, M651 may be placed into the input chain, to also allow the toleration of those asynchronisms that do not present themselves as pure clock pulse offset or phase shift. These temporary buffers are preferably designed as FIFO (first-in, first-out) memories. Such a memory has one input and one output, and is able to store several memory words. An incoming memory word is displaced in its position with the arrival of a new memory word. After the last position (the depth of the buffer), it is moved "out of the memory." If such a buffer is present, one can also tolerate asynchronisms up to the maximum depth of the buffer. In such a case, a fault signal must be output also when the buffer overflows.

Moreover, in the comparator, example embodiments may be differentiated by the manner in which signal M520 (or M620) is generated. One preferred specific embodiment provides for applying input signals M510, M511 (or M610, M611) to the output and for the connection to be interruptible by switches. The particular advantage of this specific embodiment is that these same switches may be used for switching between performance mode and possible different compare modes. Alternatively, the signals may also be generated from buffer memories that are internal to the comparator.

One last type of example embodiments may be differentiated by how many inputs are present at the comparator and by how the comparator is to react. In the case of three inputs, a majority voting, a comparison of all three, or a comparison of only two signals may be undertaken. In the case of four or more inputs, additional embodiments are conceivable. A detailed description of the possible embodiments is contained in the description of FIG. 20.

The precise selection of the example embodiments is to be coupled to the various operating modes of the overall system. That is to say, if there are several different performance or compare modes, these are then coupled to the corresponding mode of the comparator.

At a few points in this invention, it is necessary or advantageous to deactivate a comparator or a more general voting/processing/sorting element (for the sake of simplicity, hereinafter always known as comparator), or to make it passive. There are many possibilities for doing so. First of all, a signal may be carried to the comparator, which activates or deactivates it. To that end, an additional logic, which is able to accomplish this, must be inserted in the comparator. Another possibility is to supply no data to be compared to the comparator. A third possibility is to ignore the fault signal of the comparator on the system level. Moreover, one may also interrupt the fault signal itself. What all the possibilities have in common is that it is unimportant in the system that two or more items of data that are potentially to be compared, are different. If this is the case, the comparator is regarded as passive or deactivated.

In the following text, an implementation of a changeover switch in conjunction with a comparator, i.e., a switchover and compare unit G70, is considered. This implementation is particularly advantageously if it is executed inside a chip together with execution units G10a, G10b.

By combining the components of comparator and changeover switch, an only very low hardware overhead results upon implementation within a chip. One variant of the implementation is therefore to combine these two parts in one component. This is a component that has at least the input signals (output execution unit 1, output execution unit 2), at least the output signals (output 1, output 2), a logical output signal "output overall" (may agree physically with output 1 or output 2) and a comparator. The component has the ability to switch the mode, to let through all signals in the performance mode, and to compare a plurality of signals and, if applicable, let one through in a compare mode. Additionally, still further input and output signals are advantageous: A fault signal to signal a detected fault, a mode signal to signal the mode in which this component finds itself, and control signals from and to the component.

In one exemplary embodiment, the two or more execution units are connected as master to a bus internal to the processor in performance mode. The compare unit is deactivated, or the fault signal, which is generated in response to a different behavior of the execution units in one of the conceivable compare modes, is masked. This means that the switchover and compare unit is transparent for the software. In the compare mode that is being examined, the physical execution units that are to be compared are treated as one logical execution unit at the bus, that is, only one master appears at the bus. The fault signal of the comparator is activated. To this end, with the exception of one, the switchover and compare unit separates all execution units from the bus internal to the processor with the aid of a switch, duplicates the inputs of the one logical execution unit and makes them available to all execution units that are participating in the compare mode. In the case of writing to the bus, the outputs are compared in the compare unit, and, given equality, this data is written to the bus via the one available access.

In FIG. 15 and FIG. 16, the behavior in principle of component M700 (switchover and compare unit, corresponds to G70) is described. For the sake of simplicity, this figure is drawn only for two execution units. FIG. 15 shows the status of the component in compare mode, FIG. 16 shows the status in performance mode. The various switch positions in these modes are realized by M700 through drive circuit M760. In performance mode, the two execution units M730, M731 are initially able to write to data and address bus M710 when switches M750 and M751 are closed, as shown in FIG. 16. It is assumed that possible write conflicts are resolved either via the bus protocol or by further components not drawn in. In compare mode, the behavior is different, at least from the logical point of view. As shown in FIG. 15, switches M750, M751 are then opened, and the options for direct access are therefore interrupted. However, in contrast to FIG. 16, switches M752, M753 are then closed in FIG. 15. Signals M740, M741 of execution units M730, M731 are routed to compare component M720. As a minimum, it is set up as drawn in FIG. 13, but it may also contain expansions as described in FIG. 14. However, a representation of the fault signal or also of further signals of compare component M720 is omitted in FIG. 15 and FIG. 16. If the two signals agree, switch M754 is closed and one of the two matching signals is then relayed to address/data bus M710. In sum, this requires that switchover and compare unit M700 be able to influence switches M750-M754. The specific switch position is a function of the mode and the fault detection. Variants in which switch M754 is always closed and a suitable system reaction is generated by the fault signal are hereby covered as well.

FIG. 17 shows a variant of the switchover and compare unit. Even for a simple system having only two execution units G10a, G10b, there are already many variants for the implementation of a switchover and compare unit. An additional one, which is particularly advantageous if no buffers are to be used in the comparator, is shown in FIG. 17. As in FIG. 15 and FIG. 16, signals M840, M841 of the execution units are present. The latter are not shown in this figure. Present in component M800 of the present invention is a mode logic M810, which specifies the mode of the component. In performance mode, it closes switch M831, and opens it in compare mode. Moreover, it sends the mode signal to comparator M820. In this implementation, the comparator always performs a comparison, but uses the result of the comparison and the mode signal to trigger switch M830. In performance mode, the switch is always closed, and in compare mode it is closed whenever there is no fault.

Naturally, if a fault has been determined at a particular point, the switch may continue to remain open until a suitable reset arrives.

FIG. 18 shows another example embodiment of the switchover and compare unit. While this alternative actually has more switches, it leaves the comparator inactive in performance mode and is therefore also able to handle asynchronisms more easily. There are again the two signals M940, M941 of the execution units. The latter are again not shown in this figure. Included in component M900 of the present invention is a mode logic M910, which specifies the mode of the component. In performance mode, it closes switch M931 and opens switches M932, M933. Comparison component M920 is therefore not supplied with data in this mode. In the event of asynchronisms, this allows longer buffer times, or in one implementation, smaller buffer depths. In performance mode, switch M930 is always closed. In compare mode, component M910 closes switches M932, M933 and interrupts the direct access to the bus by opening switch M931. Optionally, mode logic M910 may even communicate the mode to comparator M920. In the fault-free case, switch M930 is closed in compare mode. In the case of a fault, comparison component M920 interrupts the transmission of signal M940 to the bus by opening switch M930.

In the illustrations described, it is possible to conduct the mode or fault signals to the outside without extra measures. Furthermore, it is easily possible for further signals to go to the component, especially in order to generate the internal mode state.

In summary, an example implementation of this component is thus characterized in that there is a plurality of processing units, which are able to write output signals onto the bus (e.g., address/data bus). It is essential that the component be able to process at least two of the output signals of the execution units (e.g., compare, but possibly also vote or sort), and that the component be able to influence at least one switch by which at least one of the direct bus accesses is interrupted. This is especially useful when the execution units are processor cores. Moreover, it is advantageous if the state of the influenceable switches characterizes the operating mode of the arithmetic unit.

The system properties, especially the possible compare modes, are implemented particularly well if the component is able to route a signal to the address-data bus. Advantageously, this is a through-connection of one of the output signals of one of the execution units. Alternatively, this may result from the processing of various output signals of the various execution units.

As already became clear, for example, from the descriptions with respect to FIGS. 17 and 18, it is possible to identify mode information in the system and—depending upon the division into the components—in one of the components as well. Depending upon the implementation, this mode information may even exist explicitly in one subcomponent. In one example implementation, this signal may also be carried out of the component and made available to other parts of the system.

In the general case, the behavior according to the present invention may be elucidated with reference to FIG. 21. The signals and components N100, N110, N120, N130, N140, N141, N142, N143, N14n, N160, N161, N162, N163, N16n have the same meaning as in FIG. 20. In addition, mode signal N150 and fault signal N170 are drawn in in this figure. The optional fault signal is generated by fault circuit logic N130, which collects the fault signals, and is either a direct forwarding of the individual fault signals or a bundling of the fault information contained therein. Mode signal N150 is optional; however, its use outside of this component can be advantageous at many places. The combination of the information of switching logic N110 (that is, the function named in the description of FIG. 20) and the processing logic (that is, the establishment of the comparative operation per output signal, that is per functional value) is the mode information, and this determines the mode. Generally, this information is of course multi-valued, i.e., not representable by only one logic bit. Not all theoretically conceivable modes are practical in a given implementation; the number of permitted modes will be generally limited. The mode signal then brings the relevant mode information to the outside. A HW implementation is represented in such a way that the externally visible mode signal is able to be configured. Preferably the processing logic and the switching circuit logic are likewise configurably conceived.

These configurations are coordinated with one another. Alternatively, one may only or additionally give changes of the mode signal to the outside, as well. This has advantages, especially in a dual configuration.

This mode signal is protected. One implementation in the dual system, based on the implementation shown in FIG. 17, for instance, is shown in FIG. 19. There, signal M850 is brought out of the switchover and compare unit. In a dual system, this information is logically representable via one bit. A protection may then advantageously be represented via a dual-rail signal. In the general case, the signal may likewise be protected via doubling, which is optionally inverted. Alternatively, a parity may also be generated, which preferably is generated internally in an intrinsically safe manner, or a CRC (cyclic redundancy check) or ECC (error correcting code) may be used.

The mode signal may be used outside of the component. First of all, it may be employed for self-monitoring of the operating system. From the SW standpoint, it is responsible for a switchover and should always know the mode the system is in and should also bring the system into this mode. A check of this signal may thus be used for the protection. First of all, this may be done directly. However, an alternative possibility is also to determine the plausibility of a query in the operating system with this signal via timers or other "independent" units.

In general, as an option, this signal may also be used in other data sinks of a μC (or more general arithmetic unit). For example, an MPU (memory protection unit) may be programmed in such a way that it allows specific memory accesses (of specific execution units) only in specific modes. In this context, an MPU is a unit which is able to ensure that only allowed accesses to the data/address bus are implemented; for example, for certain program parts, it prevents access to certain address spaces. An additional protection may be provided by directing the mode signal to the MPU, suitable configuration and programming of this MPU, and evaluation of this configuration data and of the mode signal. This may possibly even simplify the programming, in the event the mode signal already constitutes sufficient information for the check test. A quasi-static programming at the initialization time of the μC then suffices. The equivalent may hold true for peripheral units. Here as well, there are applications in which an access to a corresponding peripheral element is allowed only in certain modes. An additional protection may be provided by directing the mode signal to the peripheral element, suitable configuration and programming of the peripheral element, and evaluation of this configuration data and of the mode signal. This may possibly even simplify the programming, in the event the mode signal already constitutes sufficient information for the check test. A quasi-static programming at the initialization time of the μC then suffices. Analogously, the evaluation of this signal may also be used at the interrupt controller. Such monitoring operations can then make up the basis or an essential part of the safety concept. By suitable design and SW structuring, it may be possible to base the safety concept for an entire class of faults on this mode signal in the practical application considered. This is particularly advantageous if the mode signal in a suitable form, as described above, is intrinsically safe. In this case, it is then further advantageous if the component considered has the possibility of sending a fault signal or activating a shutdown path if it detects an inconsistency between the mode signal and the access to itself.

Another important use is the evaluation of the mode signal outside of the arithmetic unit. A direct practical application is the evaluation in a decrementing watchdog. Such a watchdog is made up of at least one (counter-) register, which can be set to an integer value by the microprocessor. After this register has been set, the watchdog independently decrements the value of the register with a fixed period. If the value of the register is zero or if an overflow occurs, the watchdog generates a fault signal. If the fault signal is not to be generated, then the microprocessor must reset the value of the register again in good time. It is thereby possible to check (within limits), whether the microprocessor is correctly executing the software. If the microprocessor is no longer executing the software correctly, it is assumed that in this case, the watchdog is also no longer being operated correctly, and a fault signal is therefore generated by the watchdog. The integrity of the hardware and of the data structures may be checked reliably in a compare mode; to that end, however, it is necessary to ensure that the microprocessor switches back again at regular intervals into this mode. Therefore, the task of the watchdog described here is to generate a fault signal not only when it is no longer reset within a defined period of time, but also when the microprocessor no longer switches back to the defined compare mode within a defined period of time. For example, the watchdog can be reset only when the mode signal indicates the defined compare mode of the arithmetic unit. It is thereby ensured that the arithmetic unit switches back to this mode at regular intervals. Alternatively or additionally, the value in the register of the watchdog is decremented only when specific interrupts are triggered in the microprocessor. To that end, the external interrupt signals of the μC must also be coupled to the watchdog. In the watchdog it is stored which interrupts switch the μC into the defined compare mode. The watchdog is "wound up" as soon as such an interrupt arrives; it is reset by the presence of the correct mode signal.

Quite generally, it is useful, especially in the application to a safety concept, to evaluate the mode signal in a source external to the μC. An important point in safeguarding the correct execution of the software on a computer, as it is described in the present invention, is the correct change between the various allowed modes. First of all, the change capability itself should be checked, preferably also the correct change. As described above, one may also take an interest that a special mode is assumed at regular intervals. Such a method is always especially advantageous if the mode signal itself is intrinsically safe.

One option provides for directing the mode signal to an ASIC or another μC. Using this signal, it is able to check at least the following points via timers and simple logic:

Does the arithmetic unit come sufficiently often (e.g., at the latest every 1000 μs) into one or several defined modes?

Is a specific signal always output in response to the change to a mode?

Does the arithmetic unit regularly go out of a mode?

Are certain simple patterns of the sequence of the modes valid?

Is a general time pattern valid (e.g., on average <70% in mode 1 and <50% in mode 2)

Any combination of logical, temporal properties of the mode signal, possibly supplemented by using additional signals.

In FIG. 22, the basic configuration for a proposal going beyond this is described in which a special query/response game is implemented between such a partner ASIC or partner μC and the considered processing unit, which makes use of this invention. N300 is an arithmetic unit which is able to emit such a mode signal. For example, it may be a μC having a plurality of execution units and another component, which is capable of generating this mode signal. This other component may be realized as in FIG. 19 or FIG. 21, for instance. N300 transmits this signal N310 to the partner (e.g., other arithmetic unit, other µC or ASIC) N330. It is able to ask N300 questions via signal N320, which N300 has to answer via N321. Such a query may be a computing task, whose correct result is to be supplied by N300 via N321 within a defined time interval. N330 is able to check the correctness of this result independently of N300. For example, the results are stored in N330, or N330 can calculate them itself. Upon detection of an incorrect value, a fault is imposed. The special feature in the query-response communication proposed is that the mode signal is observed in parallel with the reply. Preferably, the questions are to be asked in such a way that for the reply by N300, it must assume certain modes. It may thereby be checked in reliable fashion that all mode changes are functional, and that mode changes provided in the program run are also carried out. This may be used as an essential component of a safety concept, particularly during the initializing of a system, but also during operation.

A further application of this idea is an evaluation of the mode signal in an actuator drive circuit. In many applications in the automotive sector, there is a trend today to so-called intelligent actuators. They are actuators having a minimal amount of electronics, which are sufficient to receive an actuator control command and to then drive the actuator in such a way that this control command will then be executed as well.

The basic idea is illustrated in FIG. 23. An arithmetic unit N400, which makes use of the present invention, gives a control command via connection N420 to an (intelligent) actuator or an actuator drive circuit N430. It gives the mode signal to this actuator concurrently via connection N410. Based on the mode signal, actuator N430 checks whether the driving is allowed, and optionally gives a fault status back via signal N440. In the event of incorrect driving, it assumes the fail-silence state which is uncritical in the system.

What is claimed is:

1. A method for performing a switch-over operation in a computer system having at least two execution units, comprising:
performing a switch-over between at least two operating modes by a switch-over unit, wherein a first operating mode is a compare mode and a second operating mode is a performance mode;
providing an interrupt controller; and
providing at least three memory areas,
wherein access to the at least three memory areas is configured so that:
in the second operating mode, a first memory area is configured to be selectively assigned to at least a first execution unit, a second memory area is configured to be selectively assigned to at least a second execution unit, and in the first operating mode, a third memory area is configured to be selectively assigned to at least the first execution unit and the second execution unit.

2. The method as recited in claim 1, wherein in the performance mode, interrupt sources are distributed to the at least two execution units.

3. The method as recited in claim 1, wherein all interrupt sources are assigned to the interrupt controller.

4. The method as recited in claim 1, wherein, in the comparison mode, the third memory area is commonly assigned to the at least two execution units.

5. The method as recited in claim 1, wherein, in the performance mode, assignment of the first memory area to the first execution unit is active, assignment of the second memory area to the second execution unit is active, and assignment of the third memory area is not active.

6. The method as recited in claim 1, wherein in the comparison mode, the interrupt controllers trigger the same interrupt simultaneously at the at least two execution units.

7. The method as recited in claim 1, wherein, in each of the comparison mode and the performance mode, only one memory area is assigned to each of the first and second execution units.

8. The method as recited in claim 1, wherein, in the switch-over from the comparison mode to the performance mode, assignment status of at least one of the first, second and third memory areas is changed.

9. The method as recited in claim 1, wherein writing to any one of the first, second, or third memory area is not allowed during a transition from the performance mode to the compare mode or from the compare mode to the performance mode.

10. The method as recited in claim 1, wherein writing to a selected memory area is allowed only in an operating mode in which the assignment of the selected memory to a corresponding execution unit is active.

11. The method as recited in claim 1, wherein, in the performance mode, only one memory area is assigned to each of the first and second execution units.

12. The method as recited in claim 4, wherein, in the comparison mode, assignment of the first memory area to the first execution unit is not active, assignment of the second memory area to the second execution unit is not active, and assignment of the third memory area to the first and second execution units is active.

13. A device for performing a switch-over operation in a computer system having at least two execution units, comprising:
a switch-over unit configured to perform a switch between at least two operating modes, wherein a first operating mode is a comparison mode and a second operating mode is a performance mode;
an interrupt controller; and
at least three memory areas,
wherein access to the at least three memory areas is configured so that:
in the second operating mode, a first memory area is configured to be selectively assigned to at least a first execution unit, a second memory area is configured to be selectively assigned to at least a second execution unit, and in the first operating mode, a third memory area is configured to be selectively assigned to at least the first execution unit and the second execution unit.

14. The device as recited in claim 13, wherein in the performance mode, interrupt sources are distributed to the at least two execution units.

15. The device as recited in claim 13, wherein all interrupt sources are assigned to the interrupt controller.

16. The device as recited in claim 13, wherein, in the comparison mode, the third memory area is commonly assigned to the at least two execution units.

17. The device as recited in claim 13, wherein the first, second and third memory areas are situated in the interrupt controller.

18. The device as recited in claim 13, wherein, in the performance mode, assignment of the first memory area to the first execution unit is active, assignment of the second memory area to the second execution unit is active, and assignment of the third memory area is not active.

19. The device as recited in claim 13, wherein in the comparison mode, the interrupt controllers trigger the same interrupt simultaneously at the at least two execution units.

20. The device as recited in claim 13, wherein, in each of the comparison mode and the performance mode, only one memory area is assigned to each of the first and second execution units.

21. The device as recited in claim 13, wherein, in the switch-over from the comparison mode to the performance mode, assignment status of at least one of the first, second and third memory areas is changed.

22. The device as recited in claim 21, wherein, in the switch-over from the comparison mode to the performance mode, the change in the assignment status of at least one of the first, second and third memory areas takes place by activation of a switch.

23. The device as recited in claim 13, wherein, in the comparison mode, assignment of the first memory area to the first execution unit is not active, assignment of the second memory area to the second execution unit is not active, and assignment of the third memory area to the first and second execution units is active.

* * * * *